(12) United States Patent
Najork et al.

(10) Patent No.: US 7,007,027 B2
(45) Date of Patent: Feb. 28, 2006

(54) ALGORITHM FOR TREE TRAVERSALS USING LEFT LINKS

(75) Inventors: Marc A. Najork, Palo Alto, CA (US); Chandramohan A. Thekkath, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 532 days.

(21) Appl. No.: 10/308,293

(22) Filed: Dec. 2, 2002

(65) Prior Publication Data

US 2004/0107186 A1    Jun. 3, 2004

(51) Int. Cl.
G06F 17/30 (2006.01)
(52) U.S. Cl. ..................................................... 707/10
(58) Field of Classification Search .............. 707/1–10, 707/100–104.1, 200–206
See application file for complete search history.

(56) References Cited

OTHER PUBLICATIONS

Sagiv, Y. "Concurrent Operations on B*-Trees with Overtaking", 1986, Joural of Computer Science, vol. 33, pp. 275-296.*
Shimin Chen, "Fractal prefetching B*-Trees: optimizing both cache and disk performance", 2002, ACM Press, N.Y., N.Y., pp. 157-168.*
Antoshenkov, G., "Random Sampling from Pseudo-Ranked B+ Trees," *VLDB*, 1992, 375-382.
Arnow, D.M. et al., "An Empirical Comparison of B-Trees, Compact B-Trees and Multiway Trees," *SIGMOD Conference*, 1984, 33-46.
Baeza-Yates, R.A. et al., "Performance of B+-Trees with Partial Expansions," *TKDE*, 1989, 1(2), 248-257.
Baeza-Yates, R.A., "An Adaptive Overflow Technique for B-Trees," *EDBT*, 1990, 16-28.
Baeza-Yates, R.A., "Modeling Spits in File Structures," *Acta Informatica*, 1989, 26(4), 349-362.
Baeza-Yates, R.A., "The Expected Behavior of B+-Trees," *Acta Informatica*, 1989, 26(5), 439-471.
Bayer, R. et al., "Concurrency of Operations on B-trees," *Acta Informatica*, 1977, 9, 1-21.
Bayer, R. et al., "Organization and Maintenance of Large Ordered Indexes", *Acta Informatica*, 1972, 1, 173-189.
Bayer, R. et al., "Prefix B-Trees," *TODS*, 1977, 2(1), 11-26.
Biliris, A., "A Comparative Study of Concurrency Control Methods in B-Trees," *Aegean Workshop on Computing*, 1986, 305-316.
Biliris, A., "Operation Specific Locking in B-Trees," *PODS*, 1987, 159-169.
Boswell, W. et al., "Alternatives to the B+-Trees," *ICCI*, 1990, 266-274.
Chu, J-H. et al., "AN Analysis of B-Trees and Their Variants, " *IS*, 1989, 14(5), 359-370.

(Continued)

*Primary Examiner*—Diane Mizrahi
(74) *Attorney, Agent, or Firm*—Woodcock Washburn LLP

(57) ABSTRACT

An information management system includes a computer and a database comprising a B-Tree data structure comprising a plurality of nodes associated with disk blocks and handles stored in the nodes. At least one left-link handle, $h_{left}$, stored in each node points to a left sibling of that node. A mechanism for performing a lookup operation with respect to a key, k, traverses the B-Tree and refers to the left-link handle, $h_{left}$, of a node to access a left sibling of the node if the key k is less than or equal to a value $k_{min}$ stored in the node. Mechanisms are also provided for performing insert and delete operations, and the lookup, insert, and delete operations detect if the key range of an index node, A, does not include the key k that the operation is trying to locate, and follow a handle $A.h_{left}$ to the left sibling when $k \leq A.k_{min}$.

14 Claims, 23 Drawing Sheets

OTHER PUBLICATIONS

Comer, D., "The Ubiquitous B-Tree", *Computing Surveys*, Jun. 1979, 11(2), 121-137.

Diehr, G. et al., "Optimal Pagination of B-Trees with Variable-Length Items," *CACM*, 1984, 27(3), 241-247.

Eisenbarth, B. et al., "The Theory of Fringe Analysis and its Application to 2-3 Trees and B-Trees," *Information and Control*, 1982, 55(1-3), 125-174.

Eiter, T. et al., "Sperrverfahren fur B-Baume im Vergleich," *Informatik Spektrum*, 1991, 14(4), 183-200.

Ellis C., "Concurrent Search and Insertion in 2-3 trees," *Acta Informatica*, 1980, 14,63-86.

Faloutsos, C. et al., "On B-Tree Indices for Skewed Distributions," *VLDB*, 1992, 363-374.

Ferguson, D.E., "Bit-Tree, A Data Structure for Fast File Processing," *CACM*, 1992, 35(6), 114-120.

Fu, A. et al., "Concurrency Control of Nested Transactions Accessing B-Trees", *ACM*, 1989, 270-285.

Fujimura, K. et al., "On Robustness of B-Trees," *TKDE*, 1993, 5(3), 530-534.

Goh, C.H. et al., "Indexing Temporal Data Using Existing B+-Trees," *DKE*, 1996, 18(2), 147-165.

Goodman, N. et al., "Semantically-based Concurrency Control for Search Structures," *Principles Of Database Systems*, 1985, 8-19.

Gupta, G.K., "A Self-Assessment Procedure Dealing with Binary Trees and B-Tress," *Communications of the ACM*, 1984, 27(5), 435-443.

Gupta, U.I. et al., "Ranking and Unranking of B-Trees," *Journal of Algorithms*, 1983, 4(1), 51-60.

Hardjono, T. et al., Search Key Substitution in the Encipherment of B-Trees, *VLDB*, 1990, 50-58.

Held, G. et al., "B-Trees Re-Examined," *Communications of the ACM*, 1978, 21(2), 139-143.

Hellerstein, J.M. et al., "Generalized Search Trees for Database Systems," *VLDB*, 1995, 1-12.

Ishak, R., "Semantically Consistent Schedules for Efficient and Concurrent B-Tree Restructuring," *ICDE*, 1992, 184-191.

Jannink, J., "Implementing Deletion in B+-Trees," *SIGMOD Record*, 1995, 24(1), 33-38.

Johnson, T. et al., "A Framework for the Performance Analysis of Concurrent B-Tree Algorithms," *PODS*, 1990, 273-287.

Johnson, T. et al., "B-Trees with Inserts and Deletes: Why Free-at-Empty is Better than Merge-at-Half," *Journal of Computer and System Sciences*, 1993, 47(1), 45-76.

Johnson, T. et al., "The Performance of Current B-Tree Algorithms," *ACM Transactions On Database Systems*, 1993, 18(1), 51-101.

Johnson, T. et al., "Utilization of B-Trees with Inserts, Deletes and Modifies," *PODS*, 1989, 235-246.

Keller, A.M. et al., "Concurrent Use of B-Trees with Variable-Length Entries," *SIGMOD Record*, 1988, 17(2), 89-90.

Kersten, M. et al., "Application of an Optimistic Concurrency Control Method," *Software Practice and Experience*, 1984, 14(2), 153-168.

Kuspert, K., "Storage Utilization in B*-Trees with a Generalized Overflow Technique," *Acta Informatica*, 1983, 19, 35-55.

Kwong, Y. et al., "A New Method for Concurrency in B-Trees," *IEE Transaction on Software Engineering*, 1982, 8(3), 211-222.

Kwong, Y. et al., "Approaches to Concurrency in B-trees," *MFCS*, 1980, 402-413.

Kwong, Y. et al., "Concurrent Operations in Large Ordered Indices," *Lecture Notes in Computer Science*, 1980, 83, 207-222.

Kwong, Y-S. et al., "On B-Trees: Routing Schemes and Concurrency," *SIGMOD Conference*, 1980, 207-213.

Langenhop, C. et al., "A Model of the Dynamic Behavior of B-Trees," *Acta Informatica*, 1989, 27(1), 41-59.

Lanin, V. et al., "A Symmetric Concurrent B-Tree Algorithm," *FJCC*, 1986, 380-389.

Lanka, S. et al., "Fully Persistent B+-Trees," *SIGMOD Conference*,1991, 426-435.

Lausen, G., "Integrated Concurrency Control Shared B-Trees," *Computing*, 1984, 33(1), 13-26.

Lehman, P.L. et al., "Efficient Locking for Concurrent Operations on B-Trees", *ACM Transactions on Database Systems*, Dec. 1981, 6(4), 650-670.

Leung, C., "Approximate Storage Utilisation of B-Trees: A Simple Derivation and Generalisation," *Information Processing Letters*, 1984, 19(4), 199-201.

Lomet, D.B. et al., "Access Method Concurrency with Recovery," *SIGMOD Conference,*, 1992, 351-360.

Lomet, D.B., "Multi-Table Search for B-Tree Files," *SIGMOD Conference*, 1979, 35-42.

Lomet, D.B., "Partial Expansions for File Organizations with an Index," *ACM Transactions on Database Systems*, 1987, 12(1), 65-84.

Lum, V.Y., "Multi-Attribute Retrieval with Combined Indexes," *Communications of the ACM*, 1970, 13(11), 660-665.

Maelbrancke, R. et al., "Optimizing Jan Jannink's Implementation of B+-Tree Deletion," *SIGMOD Record*, 1995, 24(3), 5-7.

McCreight, E.M., "Pagination of B*-Trees with Variable-Length Records," *Communications of the ACM*, 1977, 20(9), 670-674.

Mohan, C. et al., "Algorithms for Creating Indexes for Very Large Tables Without Quiescing Updates," *SIGMOD Conference*, 1992, 361-370.

Mohan, C. et al., "ARIES/IM: An Efficient and High Concurrency Index Management Method Using Write-Ahead Logging," *SIGMOD Conference*, 1992, 371-380.

Mohan, C., "ARIES/KVL: A Key-Value Locking Method for Concurrency Control of Multiaction Transactions Operating on B-Tree Indexes," *Proceedings of the 16th VLDB Conference*, 1990, 392-405.

Mond, Y. et al., "Concurrency Control in B-Trees+-Trees Database Using Preparatory Operations," *VLDB*, 1985, 331-334.

Nakamura, T. et al., "An Analysis of Storage Utilization Factor in Block Split Data Structuring Scheme," *VLDB*, 1978, 489-495.

Nurmi, O. et al., "Concurrency Control in Database Structures with Relaxed Balance," *PODS*, 1987, 170-176.

O'Neil, P.E., "The SB-Tree: An Index-Sequential Structure for High-Performance Sequential Access," *Acta Informatica*, 1992, 29(3), 241-265.

Olken, F. et al., "Random Sampling from B+ Trees," *Proceedings of the 15th International Conference on Very Large Data Bases*, 1989, 269-277.

Ouksel, M. et al., "Multidimensional B-Trees: Analysis of Dynamic Behavior," *BIT*, 1981, 21, 401-418.

Phuc, N.H. et al., "Performance Comparison Between B*-Tree and Prefix Binary Tree Index Organizations," *International Conference On Databases*, 1983, vol. 19, 358-376.

Pinchuk, A.P. et al., "Maintaining Dictionaries: Space-Saving Modifications of B-Trees," *ICDT*, 1992, 421-435.

Pollari-Malmi, K. et al., "Concurrency Control in B-Trees with Batch Updates", *IEEE Transactions on Knowledge and Data Engineering*, Dec. 1996, 8(6), 975-984.

Rosenberg, A.L. et al., "Compact B-Trees," *SIGMOD Conference*, 1979, 43-51.

Rosenberg, A.L. et al., "Time- and Space-Optimality in B-Trees," *ACM Transactions On Database Systems*, 1981, 6(1), 174-193.

Samadi, B., "B-Trees in a System with Multiple Users," *Information Processing Letters*, 1976, 5(4), 107-112.

Sagiv, Y., "Concurrent Operations on B*-Trees with Overtaking", *Journal of Computer and System Sciences*, 1986, 33, 275-296.

Scheuermann, P. et al., "Multidimensional B-Trees for Associative Searching in Database Systems," *Information Systems*, 1982, 7(2), 123-137.

Seeger, B. et al., "Multi-Disk B-Trees," *SIGMOD Conference*, 1991, 436-445.

Setzer, V.W. et al., "New Concurrency Control Algorithms for Accessing and Compacting B-Trees," *Proceedings of the 20$^{th}$ VLDB Conference*, 1994, 238-248.

Snyder, L., "On B-Trees Re-Examined," *Communications of the ACM*, 1977, 21(7), 594.

Spirn, J.R. et al., "Memory Management for B-Trees," *Performance Evaluation*, 1985, 5, 159-174.

Srinivasan, V. et al., "Performance of B+ Tree Concurrency Algorithms," *VLDB Journal.*, 1993, 2(4), 361-406.

Srinivasan, V. et al., "Performance of B-Tree Concurrency Algorithms," *SIGMOD Conference*, 1991, 416-425.

Srinivasan, V. et al., "Performance of On-Line Index Construction Algorithms," *EDBT*, 1992, 293-309.

Srivastava, J. et al., "Efficient Algorithms for Maintenance of Large Database," *ICDE*, 1988, 402-408.

Sullivan, M. et al., "An Index Implementation Supporting Fast Recovery for the POSTGRES Storage System," *ICDE*, 1992, 293-300.

Tharp, A.L. et al., "B+ Trees, Bounded Disorder and Adaptive Hashing," *IS*, 1991, 16(1), 65-71.

Wang, P., "An In-Depth Analysis of Concurrent B-Tree Algorithms", *Report is a Minor Revision of a Master's Thesis of the Same Title submitted to the Department of Electrical Engineering and Computer Science*, Jan. 10, 1991, 131 pages.

Wedekind, H., "On the Selection of Access Paths in a Data Base System", *Data Base Management*, 1974, 385-397.

Wright, W.E., "Some Average Performance Measures for the B-Tree," *Acta Informatica*, 1985, 21, 541-557.

Zhang, B. et al., "Unsafe Operations in B-Trees," *Acta Informatica*, 1989, 26(5), 421-438.

* cited by examiner

B-LINK TREE DATA STRUCTURE

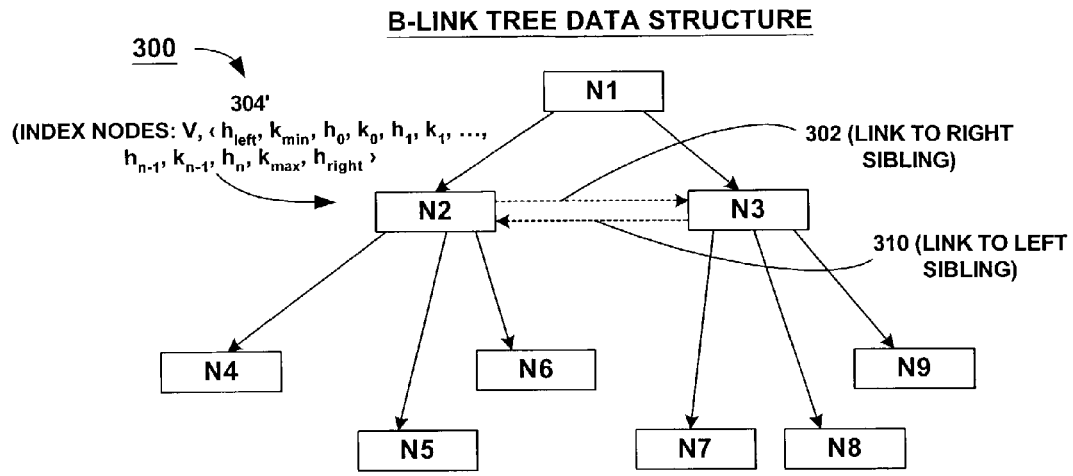

FIGURE 3B

LOOKUP PROCEDURE USING HANDLES TO LEFT SIBLINGS

```
procedure Lookup(h_p : Handle, k : Key)
        var h: Handle, A: Node;
        P := Read(h_p)
        h := last handle in P
        repeat
                A := read(h)
                if k > A.k_max then
                        h := A.h_right
                else if k <= A.k_min then
                        h := A.h_left
                else
                        choose i such that A.k_{i-1} < k <= A.k_i (let i = 0 if Num(A) = 0)
                        h := A.h_i
                endif
        until A is a leaf and A.k_min < k <= A.k_max
        if k is contained in A then
                return corresponding value
        else
                return null
        endif
endproc
```

LOOKUP PROCEDURE USING VERSION NUMBERS TO HANDLES AND DISK BLOCKS

```
procedure Lookup(h_p : Handle, k : key)
    var h: Handle, A: Node;
label start:
    P := Read(h_p)
    h := last handle in P
    repeat
330 ─────────  ┌ ─ A := read(h) ─ ─ ─ ─ ─ ─ ─ ─ ─ ─ ─ ─ ─ ─ ┐
               └ ─ if version(A) = version(h) then goto start ┘
        if k > A.k_max then
                h := A.h_right
        else if k <= A.k_min then
                goto start
        else
                choose i such that A.k_{i-1} < k <= A.k_i (let i=0 if Num(A)=0)
                h := A.h_i
        endif
    until A is a leaf and A.k_min < k <= A.k_max
    if k is contained in A then
            return corresponding value
    else
            return null
    endif
endproc
```

FIGURE 3F

ALGORITHM FOR TREE TRAVERSALS USING LEFT LINKS

COPYRIGHT NOTICE/PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED APPLICATION

The present application is related by subject matter to copending Application Ser. No. 10/308,291, filed Dec. 2, 2002, entitled "Deletion and Compaction Using Versioned Nodes."

FIELD OF THE INVENTION

The present invention relates generally to the field of information management systems (sometimes also called information retrieval systems) that store, organize and retrieve data, including but not limited to database management and file systems, and more particularly to novel data structures and algorithms for use in such systems. The invention is particularly suited for, but by no means limited to, uses in connection with B-Tree data structures and variants thereof, and SQL-type databases.

BACKGROUND OF THE INVENTION

B-Trees are a core technology to relational and non-relational databases, as well as to file systems and other systems in which a data structure including a set of linked nodes is employed as a way to index and access large amounts of data. A database management system is one example of an information management/retrieval system of the kind for which the present invention is suited. Nevertheless, because the present invention is well suited for use in connection with a database, although by no means limited thereto, the background of the invention and the exemplary embodiments will be discussed with reference to a database.

Concurrent B-Trees with minimal locking are instrumental for building distributed databases, where a single relation may span multiple machines. Distributing relations over multiple machines makes it possible to build scalable databases, where the size of the database can be increased simply by adding more hardware.

The present invention is especially concerned with ways to increase the efficiency of concurrent B-Tree algorithms. As discussed in greater detail below, the subject matter disclosed herein is directed to (a) maintaining extra data that prevents B-Tree operations from getting "lost" in the tree, which may happen in state-of-the-art algorithms due to aggressive minimization of locking operations, and (b) garbage-collecting deleted nodes without the need for any extra synchronization (the state-of-the-art algorithm uses a time-stamp-based approach to garbage collection, and requires extra synchronization to keep track of the start times of all outstanding B-Tree operations).

Further background information about B-Trees may be found in the following documents:

1. R. Bayer and E. McCreight. Organization and Maintenance of Large Ordered Indexes. Acta Informatica, 1(3):173–189, 1972.
2. D. Comer. The Ubiquitous B-Tree. ACM Computing Surveys, 11(2):121–128, June 1979.
3. P. L. Lehman and S. B. Yao. Efficient Locking for Concurrent Operations on B-Trees. ACM Transactions on Information retrieval systems, 6(4):650–670, December 1981.
4. Yehoshua Sagiv. Concurrent Operations on B-Trees with Overtaking. Journal of Computer and System Sciences, Vol. 3, No. 2, October 1986.
5. Paul Wang. An In-Depth Analysis of Concurrent B-Tree Algorithms. Technical report MIT/LCS/TR-496, Laboratory for Computer Science, Massachusetts Institute of Technology, February 1991.
6. H. Wedekind. On the selection of access paths in an information retrieval system. In J. W. Klimbie and K. L. Koffman, editors. Database Management, pages 385–397. North Holland Publishing Company, 1974.

SUMMARY OF THE INVENTION

An information management system in accordance with a first aspect of the present invention includes a computer and a database, wherein the database comprises one or more B-Tree data structure(s) each comprising a plurality of nodes associated with disk blocks (or more generally, "storage blocks," in the event the invention is employed in connection with a storage medium other than disk) and handles stored in the nodes (and optionally version numbers associated with each of the handles and nodes). At least one left-link handle, $h_{left}$, stored in each node points to a left sibling of that node. A mechanism for performing a lookup operation with respect to a key, k, traverses the B-Tree and refers to the left-link handle, $h_{left}$, of a node to access a left sibling of the node if the key k is less than or equal to a value $k_{min}$ stored in the node. Mechanisms are also provided for performing insert and delete operations, and the lookup, insert, and delete operations detect if the key range of an index node, A, does not-include the key k that the operation is trying to locate, and follow a handle $A.h_{left}$ to the left sibling when $k \leq A.k_{min}$.

Note that a "node" may span multiple disk or storage blocks, and that links and version numbers may be logically associated with nodes as opposed to individual disk blocks.

These and other features of the present invention are described below.

BRIEF DESCRIPTION OF THE DRAWINGS

FIG. 3B is a schematic illustration of a B-Link Tree in accordance with one aspect of the present invention.

FIGS. 3E and 3F show examples of pseudocode for lookup procedures employing links to left siblings and version numbers, respectively.

DETAILED DESCRIPTION OF PREFERRED EMBODIMENTS

We will now describe presently preferred implementations of the invention. First, in section A, we will describe an exemplary computing environment with reference to FIG. 1, primarily to show that the invention may be embodied in a wide variety of ways, e.g., in a data structure stored on a computer readable medium and/or a software-based process carried out on a general purpose computer. (It is well known that a B-tree algorithm requires two fundamental things: code and data structures that this code manipulates. The code can be embodied in a variety of places including in a process or in firmware. The data can be kept anywhere (with different degrees of persistence, e.g., RAM, disk, removable media, etc.). Following this description, we provide, in section B, an overview of two main aspects of the inventive data structures and methods disclosed herein. These two main aspects include (1) versioned nodes to facilitate deletion and compaction operations, and (2) left links to facilitate tree traversal operations. Sections C through F describe further details of exemplary ways in which the present invention may be implemented. Finally, section G provides a conclusion.

A. Exemplary Computing Environment

Figure 1:
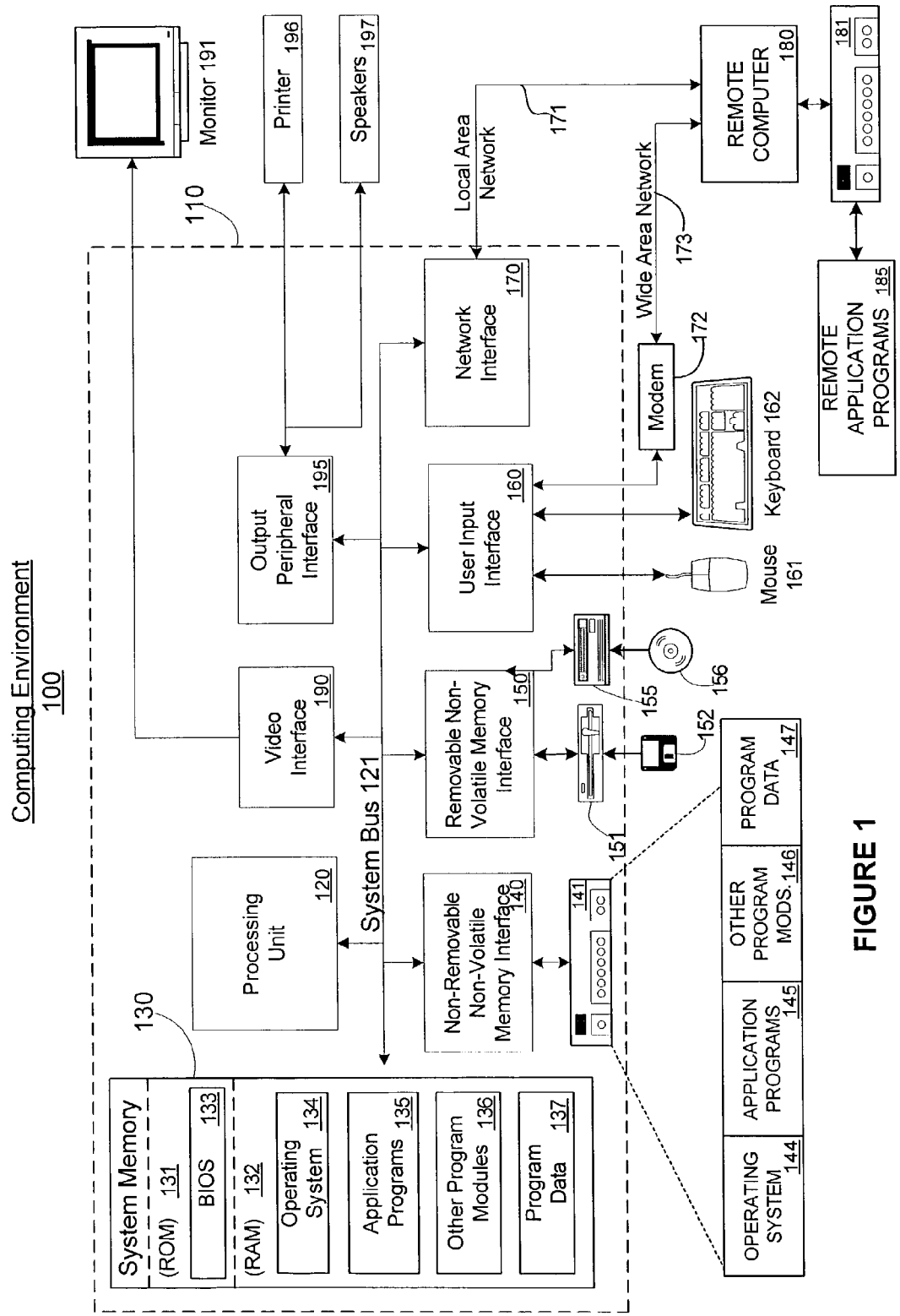
FIGS. 1 and 2 are schematic illustrations of exemplary computing environments suitable for the present invention, with FIG. 2 depicting an example of a B-Link-Tree data structure stored in a persistent store such as (but not limited to) a database.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, disk controllers, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the-scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish (where the dish is used to receive signals to be input to a computer), scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, storage area networks (SANs), intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

B. Overview: Versioned Nodes and Left Links

The present invention generally improves on previous methods for traversing concurrent B-Trees, and in particular it improves on an algorithm by Yehoshua Sagiv (we refer to this as the "Sagiv algorithm"). As discussed above, a B-Tree is a data structure that maintains an association of "keys" (such as employee numbers) to "values" (such as employee records). B-Trees are typically stored on disk. B-Trees are at the foundation of most information retrieval systems.

Figure 2:
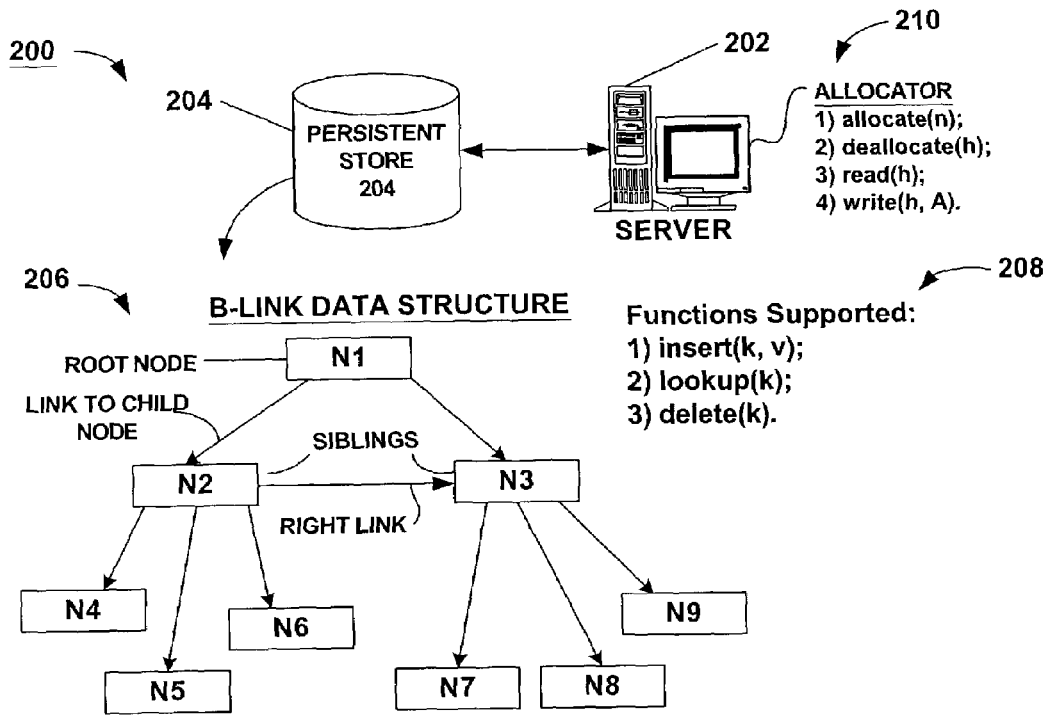

FIG. 2 depicts a typical information retrieval system 200. As shown, such a system can include a server 202 and a persistent store, such as a database, 204. In addition, the data residing in the store 204 may be organized the form of a tree, e.g., a B-Link-Tree 206. Such a data structure includes nodes, N1, N2, N3 and so on, and, in the case of index nodes, links from each node to at least one other node (data nodes typically have only incoming links). The nodes may be sized to correspond to a disk block, or may be bigger or smaller, and may be formed as data nodes and index nodes (discussed further below in connection with FIG. 3A). Further, there is a root node (node N1 in FIG. 2) and children nodes, with sibling nodes being those nodes that have a common parent (e.g., nodes N2 and N3 are siblings). Index nodes may also be linked to their right siblings, as shown.

Information retrieval systems typically support concurrent access to and updating of the data maintained by them, which means that there may be multiple concurrent lookup and update operations on the underlying B-Tree. In order to prevent these concurrent operations from corrupting the B-Tree, some synchronization scheme is required. Typical concurrent B-Tree algorithms synchronize concurrent operations at the node-level of the tree; that is, an operation that wants to modify a node of the tree has to acquire a lock on that node, in order to guarantee that it does not interfere with another concurrent update (or other) operation on the same node.

Lock acquisition is expensive in several respects: It can be computationally expensive (in particular when the B-tree is replicated across multiple computers, meaning that locks have to be acquired from a remote lock server), and it limits concurrency. It is therefore desirable to minimize the number of lock acquisitions (without compromising the correctness of the algorithm). Much research has been devoted to this topic (Paul Wang, *An In-Depth Analysis of Concurrent B-Tree Algorithms*, cited above, contains a good survey of work on this problem.) To our knowledge, the B-Tree algorithm that performs best with respect to minimizing lock acquisitions is the Sagiv algorithm (see Yehoshua Sagiv, *Concurrent Operations on B-Trees with Overtaking*, cited above).

The system described herein improves on Sagiv's algorithm in two respects: First, it avoids an inefficiency of Sagiv's algorithm, namely that operations may get "lost" while trying to locate a data record and have to be restarted; second, it introduces a scheme for garbage-collecting deleted nodes that does not require any additional lock acquisitions, while Sagiv's technique requires additional locking. The two optimizations are independent of each other, that is, Sagiv's algorithm can be improved by adding either one or both.

Before describing the invention, it is helpful to review B-Trees in general and Sagiv's algorithm in particular.

C. B-Trees and the Sagiv Algorithm

A B-Tree is a data structure that maintains an association of keys with values. A prerequisite is that there exists a total ordering over the keys, i.e., that it is always possible to decide whether one key is larger than the other. As indicated in FIG. 2, reference number 208, B-Trees support three basic operations:

1) insert(k, v), which associates the key k with the value v;
2) lookup(k), which returns the value v associated with the key k; and
3) delete(k), which disassociates the key k from its associated value.

B-Trees were first described by Bayer and McCreight (R. Bayer and E. McCreight, *Organization and Maintenance of Large Ordered Indexes*, cited above). There are many variations of B-Trees, including B*-trees (see H. Wedekind, *On the selection of access paths in an information retrieval system*, cited above), B+-Trees (see D. Comer, *The Ubiquitous B-Tree*, ACM Computing Surveys, cited above), and B-Link Trees (see P. L. Lehman and S. B. Yao, *Efficient Locking for Concurrent Operations on B-Trees*, cited above). Sagiv's algorithm uses B-Link Trees. The present invention is applicable to all types of B-Trees and variations thereof, and the term B-Tree as used herein in describing the invention is intended to encompass all variants of the basic B-Tree structure. Preferred embodiments of the invention use a new form of B-Link Tree.

A B-Link Tree (and in fact any B-Tree) stores keys and values as well as metadata in nodes. Nodes are kept on disk or some other storage device (B-Trees make sense for any slow and cheap storage device), and are read into main memory on demand, and written back to disk if modified. Nodes on disk are identified by handles. (For the purpose of this discussion, it is sufficient to think of handles as the addresses of contiguous ranges of storage blocks (e.g., disk block addresses) plus optional metadata.) As indicated in FIG. 2, reference numeral 210, an allocator is a software component that maintains nodes on disk and supports four operations:

1) allocate(n), which reserves space on the disk for a node with a maximum size of n bytes and returns a handle to it;
2) deallocate(h), which relinquishes the space at the disk location identified by the handle h;
3) read(h), which reads the node from the disk location identified by the handle h and returns it; and
4) write(h, A), which writes the node A from main memory to the disk location identified by handle h.

In the following discussion, we assume that the allocator operations are atomic, that is, two concurrent operations on the same handle do not interfere with each other.

Nodes in a B-Tree may contain handles referring to other nodes. In most B-Tree variants, the handles connect the nodes to form a tree (hence the name), a directed, connected, and acyclic graph. In the following, we assume the reader to be familiar with the definition of a tree and the terms subtree, link, root, leaf, parent, child, and sibling. B-Link Trees differ from proper trees in that in addition to the links from parents to children, every node has a link to its directly adjacent right sibling (if such a sibling exists). This can be seen in the exemplary B-Link Tree 300 of FIG. 3A, where the "right link" (link to right sibling) is represented by reference numeral 302.

Figure 3A:
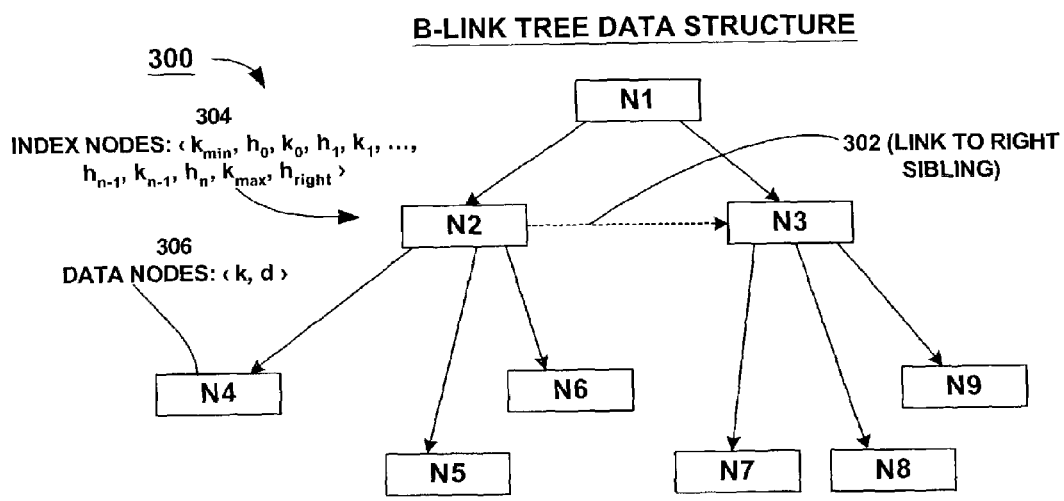
FIG. 3A is a simplified schematic illustration of a B-Link Tree in accordance with the prior art.

The B-Link Trees used by Sagiv are composed of two different kinds of nodes: data nodes and index nodes, reference numerals 304 and 306, respectively, of FIG. 3A. A data node is simply a key-value pair of the form <kid>. An index node is of the form:

$<k_{min}, h_0, k_0, h_1, k_1, \ldots, h_{n-1}, k_{n-1}, h_n, k_{max}, h_{right}>$ In the following, we refer to field x of node A as A.x. Given an index node A, $A.h_0 \ldots A.h_n$ are handles to the n+1 children of A, and $A.h_{right}$ is a handle to its right sibling. $A.k_i$ (for $0 \leq i < n$) is the largest key in the subtree rooted at handle $A.h_i$, and $A.k_{i-1}$ (or $A.k_{min}$ if i=0) is less than the smallest key in the subtree rooted at handle $A.h_i$. $A.k_{max}$ is greater or equal to the largest key in any subtree of A (and per definition ∞ if A does not have a right sibling), and $A.k_{min}$ is equal to $B.k_{max}$, where B is the left sibling of A (or −∞ if A does not have a left sibling). Moreover, $A.k_{min} < A.k_0 < \ldots < A.k_n \leq A.k_{max}$. Finally, there is a limit on the size of n (which indicates the number of keys and handles in an index node). If n reaches a maximum value (say, 2t), then the index node is said to be full. Likewise, if n falls below a certain number (say, t), the node is said to be underfull.

Because of the constraints on the keys in an index node and the keys in the subtrees rooted at that node, B-Link trees are search trees, that is, trees where one can find a particular key by descending into the tree. Intuitively, lookup(k) starts at the root handle, reads in the corresponding node A, and identifies a value i such that $A.k_{i-1}$ (or $A.k_{min}$ if i=0)<k$\leq A.k_i$ (or $A.k_{max}$ if i=n). It then recursively proceeds along the handle $A.h_i$ until it reaches a data node B, and returns B's value if B's key is indeed k, or null otherwise.

The delete operation is similar to the lookup operation: delete(k) descends into the tree until a data node D with key k is discovered (if such a node exists). The operation then marks D as deleted (D is not immediately deallocated, because other ongoing operations may have a handle to D but not yet have read D), and removes the handle to D from D's parent node A. This may cause A to become underfull.

The insert operations is more complicated: insert(k,v) allocates a new data node D with handle h, writes the pair (k,v) to it, and then recursively descends into the tree the same way as lookup does, until it finds the leaf index node A (the index node whose children are data nodes) that should receive h. If A is not full, insert(k,v) simply inserts h and k at the appropriate places into A; otherwise, it allocates a new index node $\overline{A}$, moves half of A's key-handle pairs over to $\overline{A}$, inserts k and h into A or $\overline{A}$, and finally adds the handle to $\overline{A}$ and A's new $k_{max}$ to A's parent (this may in turn cause A's parent to become overfull, causing the node splitting process to move up the tree).

As mentioned above, the delete operation may cause nodes to become underfull. To prevent too many nodes from becoming underfull (which would cause the tree to become deeper than it needs to be, which would increase the number of disk accesses required by each operation), a compression thread is run in the background. The thread repeatedly traverses the tree, searching for underfull nodes. When it locates an underfull node A, it either rebalances it with its left or right sibling (which entails moving key-handle pairs from the sibling to A, and adjusting a key in the parent node), or it outright merges A with its left or right sibling (which entails moving all of A's content to the sibling, marking A as deleted, and removing A's handle and corresponding key from A's parent, which in turn may cause the parent to become underfull).

In Sagiv's algorithm, nodes that are marked as deleted are deallocated only when it is certain that no operations have handles to those nodes. This is achieved by adding a timestamp to each deleted node, indicating the time it was deleted, and maintaining a table that records the start time of every lookup, insert, and delete operation in flight. The system maintains a list of deleted nodes. The compression thread periodically goes through the list, and deletes exactly those nodes whose timestamp predates the start times of all ongoing operations. The drawback of this scheme is that the table of start times is accessed by many threads, which means it has to be protected by a lock. Each operation requires two lock acquisitions and releases (one for adding a thread-start time pair to the table, and one for removing it).

The situation is further complicated by the fact that concurrent lookup, insert, and delete operations may interfere with one another. This could be avoided by locking every node visited during an operation, and unlocking it only once the child or sibling referenced by any extracted handle has been read (this is called "lock coupling" in the literature). Sagiv's algorithm avoids such excessive locking by using the optimistic assumption that operations usually don't interfere, detecting the cases in which this assumption was unwarranted, and recovering from the misstep.

To make things concrete, consider the case where the operation lookup(k) decides to follow a handle h, but before it can read the corresponding node A, another thread inserts a key-handle pair into A, and in the process splits A into two nodes, A and $\overline{A}$ (the newly allocated right sibling of A). After reading A, the lookup operation can detect the fact that A was split (because $k > A.k_{max}$), and can recover from this situation by following the $A.h_{right}$ handle, leading it to $\overline{A}$ (which indeed contains the appropriate range of keys). However, this inexpensive recovery is not always possible. Consider the case where the operation lookup(k) decides to follow a handle h, but before it can read the corresponding node A, the compression thread rebalances node A (which happens to be underfull), moving some of A's content, including the handle that lookup should follow, to A's left sibling $\overline{A}$. After reading A, the lookup operation can detect that A has been rebalanced (because $k \leq A.k_{min}$) but since lookup does not know the handle of $\overline{A}$, the only way to recover is to restart the lookup operation at the root of the tree.

D. Maintaining Handles to Left Siblings

According to first aspect of the present invention, to avoid restarts, we propose to modify the structure of index nodes as follows:

$$\langle h_{left}, k_{min}, h_0, k_0, h_1, k_1, \ldots, h_{n-1}, k_{n-1}, h_n, k_{max}, h_{right} \rangle$$

where $h_{left}$ is the handle of the left sibling (if there is one, and null otherwise), and all other fields are defined as in Sagiv's algorithm. This data structure is depicted in FIG. 3B, where reference 300' refers to the modified B-Link data structure and reference numeral 310 refers specifically to the left link, i.e., $h_{left}$. As in Sagiv's algorithm, the lookup, insert, and delete operations detect if the key range of an index node A does not include the key k that the operation is trying to locate. As in Sagiv's algorithm, the operation reacts to $k > A.k_{max}$ by following the handle $A.h_{right}$ to the right sibling. However, while Sagiv's algorithm reacted to $k \leq A.k_{min}$ by restarting the operation at the root, our algorithm reacts by following the handle $A.h_{left}$ to the left sibling. Following the handle to the left sibling requires one extra read operation, while restarting the operation at the root would require up to (and typically close to) d read operations, where d is the depth of the tree.

Figure 3C:
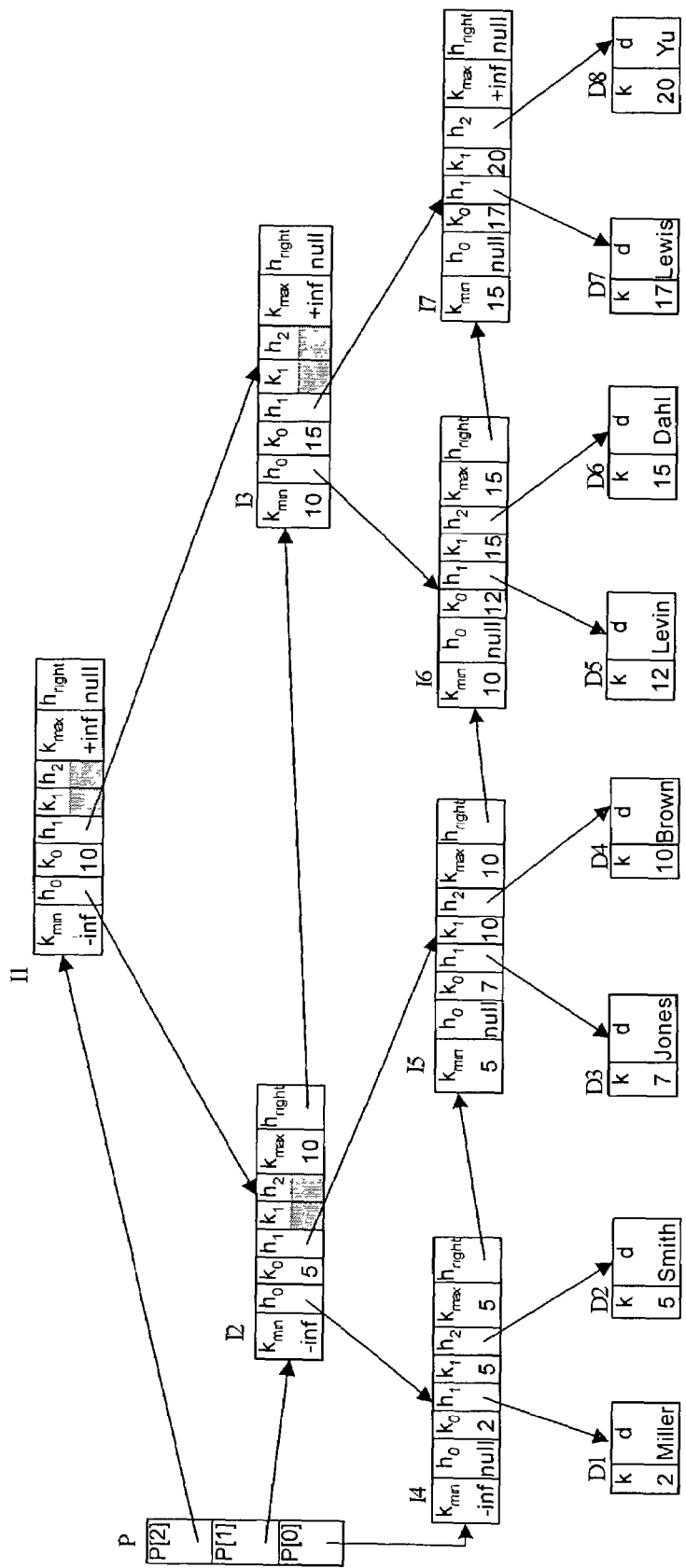
FIGS. 3C and 3D show examples of a Sagiv-style B-Link Tree (see discussion below) in accordance with the prior art and a B-Link Tree containing left links in accordance with the present invention, respectively.
Figure 3D:
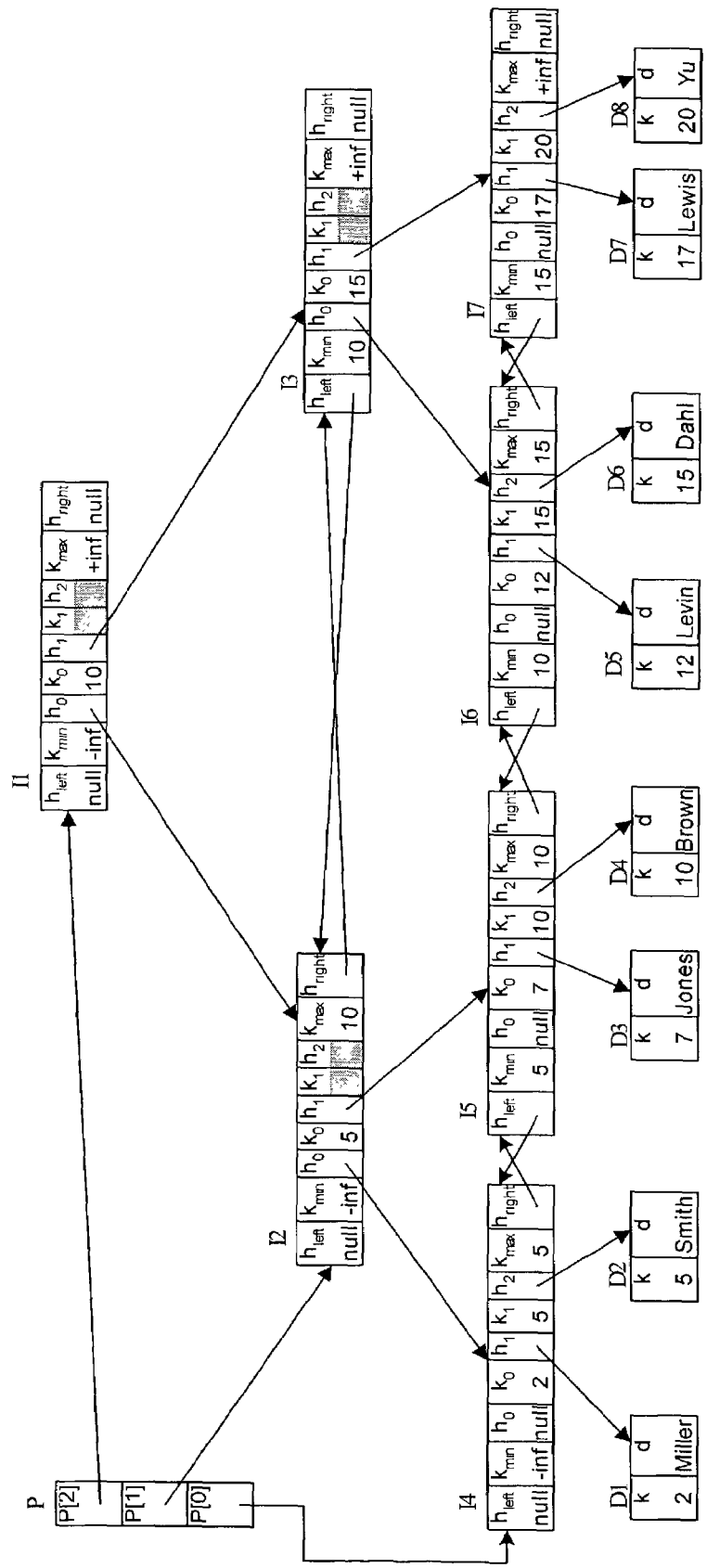

FIGS. 3C and 3D provide more detailed examples of a Sagiv-style B-Link Tree in accordance with the prior art, and a B-Link tree in accordance with the present invention, respectively. These are intended to further illustrate the left-link aspect of the present invention, and to distinguish it from the prior art.

FIG. 3C depicts a Sagiv-style B-Link tree that contains the mapping {(2, Miller), (5, Smith), (7, Jones), (10, Brown), (12, Levin), (15, Dahl), (17, Lewis), (20, Yu)}. The numbers are key values and the names are the associated data values. P is the prime node of the tree; I1, . . . , I7 are index nodes; and D1, . . . , D8 are data nodes. A prime node is a node containing an array of handles, each handle pointing to the leftmost index node of a level of the tree, with the first handle in the prime node pointing to the leftmost leaf index node, and the last one pointing to the root index node. I1 is the root node of the tree (that is, the one index node that does not have a parent). One gets to the root node by following the last handle in the prime node (P[2] in this case). I1, I2, I3 are non-leaf index nodes (that is, index nodes that have index-node children). This means that I1.$h_0$ is non-null, and that IsLeaf(I1) (IsLeaf is discussed below—see section F) is false (the same is true for I2, I3). I4, I5, I6, and I7 are leaf index nodes, that is, index nodes that do not have index-node children. This means that I4.$h_0$ is null, and that IsLeaf(I4) is true (the same is true for I5, I6, and I7). In this tree, t=2; that is, each index node can hold two keys in addition to $k_{min}$ and $k_{max}$. I1, I2, and I3 are not full (some fields are unused and shaded out). Num(I1) (Num is discussed below—see section F) is 1 (the same is true for I2, I3). I1, I2, and I3 can each take one more key-handle pair. I4, I5, I6, and I7 are full, i.e., there are no unused fields. Num(I4) is 2 (same for I5, I6, and I7).

FIG. 3D depicts a tree that contains left links $h_{left}$, as shown. The tree contains the same mapping, {(2, Miller), (5, Smith), (7, Jones), (10, Brown), (12, Levin), (15, Dahl), (17, Lewis), (20, Yu)}, as the tree in FIG. 3C. As before, the numbers are key values, the names are the associated data values. P is the prime node of the tree, I1, . . . , I7 are index nodes, D1, . . . , D8 are data nodes. I1 is the root node of the tree (that is, the one index node that does not have a parent). One gets to the root node by following the last handle in the prime node (P[2] in this case). I1, I2, I3 are non-leaf index nodes (that is, index nodes that have index-node children). This means that I1.$h_0$ is non-null, and that IsLeaf(I1) is false (same for I2, I3). I4, I5, I6, and I7 are leaf index nodes (that is, index nodes that don't have index-node children). This means that I4.$h_0$ is null, and that IsLeaf(I4) is true (same for I5, I6, and I7). In this tree, t=2 (that is, each index node can hold two keys in addition to $k_{min}$ and $k_{max}$). I1, I2, and I3 are not full (some fields are unused and shaded out). Num(I1) is 1 (same for I2, I3). I1, I2, and I3 can each take one more key-handle pair. I4, I5, 6, and I7 are full (there are no unused fields). Num(I4) is 2 (same for I5, I6, and I7).

To further illustrate the idea, we have produced below exemplary pseudocode of Sagiv's lookup operation (adapted from Yehoshua Sagiv, *Concurrent Operations on B-Trees with Overtaking*, cited above), including the code for restarting the lookup operation if the lookup goes astray (but omitting the machinery for keeping track of operation start times):

```
procedure Lookup(h_P: Handle, k : Key)
    var h: Handle, A: Node;
    label start:
        P := Read(h_P)
        h := last item in P
        repeat
            A := read(h)
            if k > A.k_max then
                h := A.h_right
            else if k ≦ A.k_min then
                goto start
            else
                choose i such that A.k_{i-1} < k ≦ A.k_i (let i be 0
                if Num(A) = 0)
                    h := A.h_i
            endif
        until A is a leaf and A.k_min < k ≦ A.k_max
        if k is contained in A then
            return corresponding value
        else
            return null
        endif
endproc
```

Figure 7:
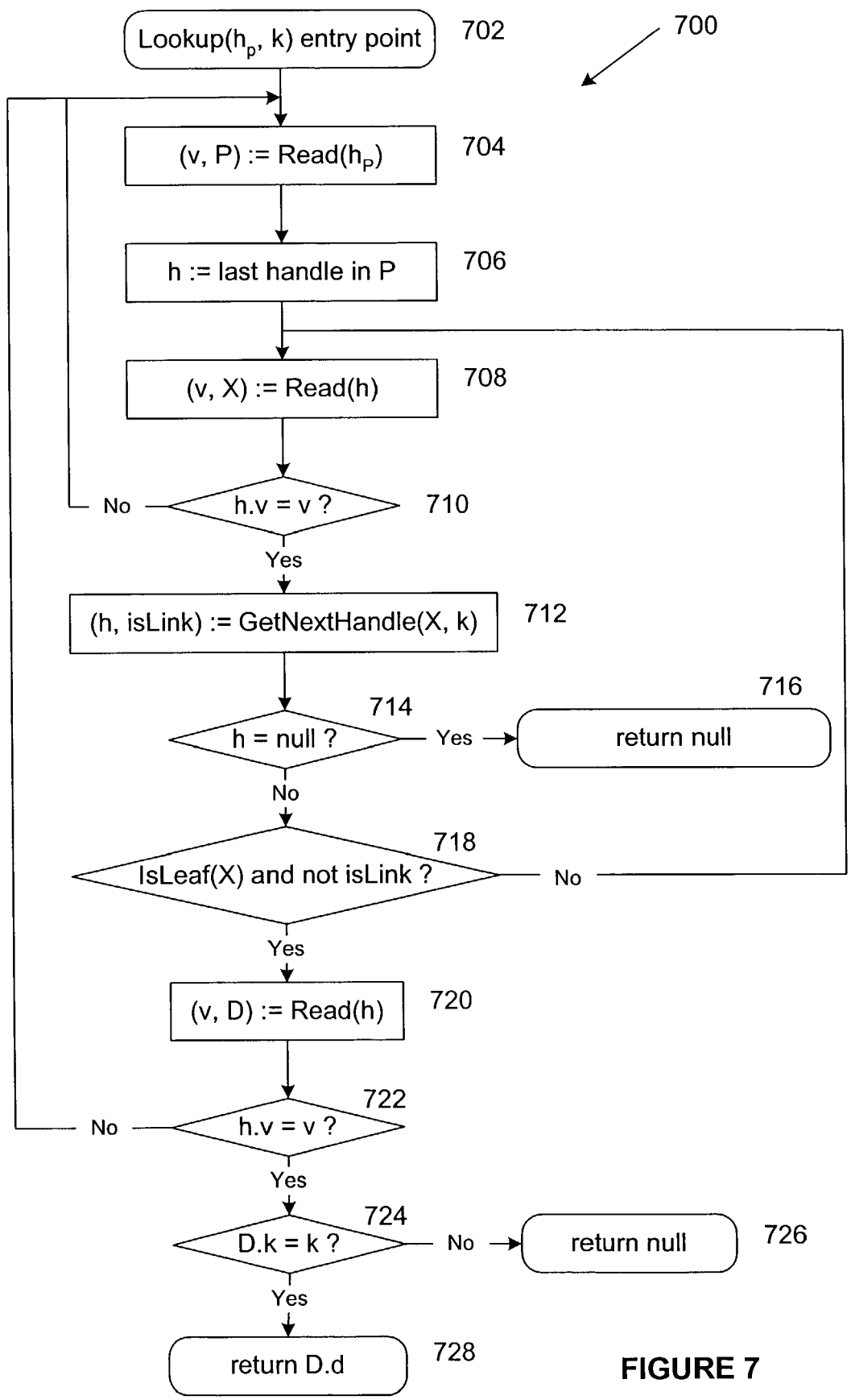
FIG. 7 is a flowchart of a procedure, Lookup, which takes a prime node handle $h_p$ and a key k and returns a data item d or null.

In contrast, here is exemplary pseudocode corresponding to one implementation of a lookup routine in accordance with the present invention. (Note that FIG. 7 depicts a flowchart of another exemplary Lookup procedure.) As can be seen, this routine follows the left-link instead of restarting the operation. This pseudocode is reproduced in FIG. 3E with a box 320 enclosing new lines of code designed to utilize the left-link data. The new lines of code determine whether the key value k is less than or equal to the value stored in the $k_{min}$ field of node A, and if so it assigns the left-link handle to the handle variable (i.e., h:=A.$h_{left}$).

```
procedure Lookup(h_P: Handle, k : Key)
    var h: Handle, A: Node;
    P := Read(h_P)
    h := last item in P
    repeat
        A := read(h)
        if k > A.k_max then
            h := A.h_right
        else if k ≦ A.k_min then
            h := A.k_left
        else
            choose i such that A.k_{i-1} < k ≦ A.k_i (let i be 0
            if Num(A) = 0)
                h := A.h_i
        endif
    until A is a leaf and A.k_min < k ≦ A.k_max
    if k is contained in A then
        return corresponding value
    else
        return null
    endif
endproc
```

E. Attach Version Numbers to Handles and Disk Blocks

We will now describe an inventive way to avoid maintaining a table of operation start times. In particular, in a presently preferred implementation, we do this by attaching version numbers to handles and nodes or the "unit of allocation" returned by the allocator 210 (FIG. 2). As mentioned above, when a node is deleted by the delete operation or by the compression thread, it is possible that a concurrent operation has a handle to it. Sagiv's algorithm deals with this problem by attaching a timestamp noting the time of deletion to every deleted node, and by recording the start time of every operation. Deleted nodes are "garbage collected" only when none of the ongoing operations have been started before the 10 node was marked as deleted. This solution requires the system to maintain a table mapping threads to start times, which requires two synchronizations—one for adding a thread-start time pair to the table and one for removing it—since the table is being mutated by the client threads and accessed by the compression thread.

According to a presently preferred implementation of our invention, version numbers are attached to each handle and to each node. Initially, each node has version number 0. The allocate operation (described above) returns a handle identifying a node and embeds the node's version number into the handle. The deallocate operation increments the node's version number (in addition to making it available for subsequent reallocation). The read operation returns a node's version number in addition to the node. The caller of the read operation (i.e., a lookup, insert, or delete operation) checks if the version number returned by the read operation matches the version number of the handle that was read. If the version numbers do not match, the node has been deleted and subsequently deallocated by a different thread. In this case, the lookup, insert, or delete operation is restarted.

Using this version numbering scheme, it is possible to deallocate nodes right when they are being marked as deleted. As a further optimization, we can defer deallocating deleted nodes for some fixed interval of time, which eliminates the needs for restarts for all but the most long-running operations.

In an alternative embodiment of this aspect of the invention, the read operation does not return the version number of the disk block that was being read, but instead raises an exception whenever the version number of the handle and the version number of the disk block do not match. The caller of the read operation (i.e., a lookup, insert, or delete operation) catches the exception and restarts the lookup, insert, or delete operation.

To further illustrate the idea, here is exemplary pseudocode of Sagiv's lookup operation (again adapted from Yehoshua Sagiv, *Concurrent Operations on B-Trees with Overtaking*), this time also including the machinery for keeping track of operation start times. T is a global variable referring to a table mapping thread identifiers to operation start times:

```
procedure Lookup(h_p: Handle, k : Key)
    var h: Handle, A: Node;
label start:
    P := Read(h_p)
    h := last handle in P
    repeat
        lock T
        insert (ID of this thread, current time) into T
        unlock T
        A := read(h)
        if k > A.k_max then
            h := A.h_right
        else if k ≤ A.k_min then
            goto start
        else
            choose i such that A.k_{i-1} < k ≤ A.k_i (let i be 0
            if Num(A) = 0)
            h := A.h_i
        endif
    until A is a leaf and A.k_min < k ≤ A.k_max
    lock T
    remove (ID of this thread, corresponding time) from T
    unlock T
    if k is contained in A then
        return corresponding value
    else
        return null
    endif
endproc
```

In contrast, here is an example of pseudocode for a lookup routine in accordance with the present invention, where this routine avoids any operations on the table T (to emphasize that our invention consists of two independent parts, this version does not incorporate the use of left-links to avoid restarts).

```
procedure Lookup(h_p: Handle, k : Key)
    var h: Handle, A: Node;
label start:
    P := Read(h_p)
    h := last handle in P
    repeat
        A := read(h)
        if version(A) ≠ version(h) then goto start
        if k > A.k_max then
            h := A.h_right
        else if k ≤ A.k_min then
            goto start
        else
            choose i such that A.k_{i-1} < k ≤ A.k_i (let i be 0
            if Num(A) = 0)
            h := A.h_i
        endif
    until A is a leaf and A.k_min < k ≤ A.k_max
    if k is contained in A then
        return corresponding value
    else
        return null
    endif
endproc
```

Note that this pseudocode is also depicted in FIG. 3F, where the box 330 indicates the new line of code ("if version(A)≠version(h) then goto start"). Moreover, the new pseudocode does not include the lines of code from the Sagiv algorithm relating to the lock operation. In other words, the following code has been eliminated:

lock T
    insert (ID of this thread, current time) into T
    unlock T

In addition, the code, lock T
    remove (ID of this thread, corresponding time) from T
    unlock T has been removed.

Of course, the two improvements disclosed herein may be combined to achieve the benefits of both of them. The pseudocode of the insert and delete operations and the compression thread is significantly more complicated but nonetheless well within the capabilities of a person skilled in the art. Moreover, the modifications needed to incorporate our invention should be straightforward after reading this specification.

F. Flowcharts of Exemplary Procedures

FIGS. 4–10 are flowcharts representing several procedures that may be employed in connection with a presently preferred implementation of an algorithm in accordance with the present invention. The following table summarizes the data types, notation and functions (index node and Allocator functions) referred to in these flowcharts.

| Primitive Types | |
| --- | --- |
| k | a key value |
| d | a data value |
| ba | a block address |
| v | a version number |
| Composite Types | |
| h = (v, ba) | a handle (may be null) |
| D = (k, d) | a data node |
| X, A, B = $(h_{left}, k_{min}, h_0, k_0, h_1, k_1, \ldots, h_{n-1}, k_{n-1}, h_n, k_{max}, h_{right})$ | an index node |
| P = $(h_0, \ldots, h_n)$ | a prime node |
| Notation | |
| h.v | refers to the version number v of handle h |
| X.$h_n$ | refers to the field $h_n$ (the rightmost child handle) of index node X |
| P [i] | refers to handle $h_1$ of prime node P (where $h_0$ refers to the leftmost leaf-level index node in the tree) |
| Index Node Functions | |
| Num (X) | returns n where X is an index node $(h_{left}, k_{min}, h_0, k_0, h_1, k_1, \ldots, h_{n-1}, k_{n-1}, h_n, k_{max}, h_{right})$ |
| IsLeaf (X) | returns true if and only if X.$h_0$ = null |
| IsDeleted (X) | returns true if and only if X.$k_{min}$ = −inf and X.$k_{max}$ = −inf |
| Allocator Functions | |
| Alloc (size) | allocates a block of the given size, and returns a handle to the block |
| Dealloc (h) | deallocates the block referred to by the handle h, and increments the block's version number |
| Read (h) | reads the block referred to by the handle h, and returns (v, N), |

| | |
|---|---|
| | the block's version number v and the node N stored in the block |
| Write (N, h) | writes the node N to the block referenced by the handle h |
| Lock (h) | locks the block referred to by the handle h |
| Unlock (h) | unlocks the block referred to by the handle h |

Figure 4:
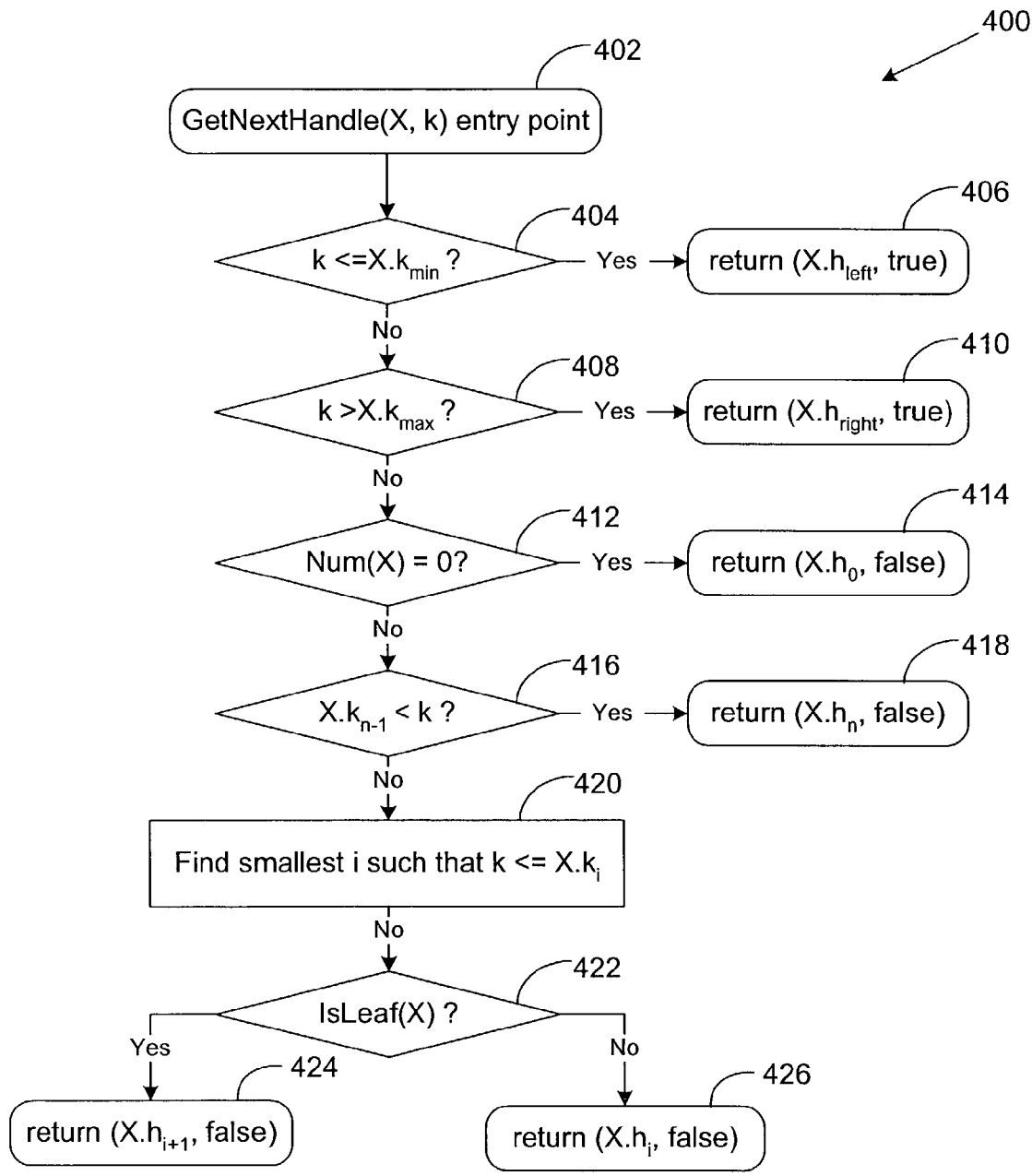
FIG. 4 is a flowchart of a procedure, GetNextHandle, which procedure takes an index node X and a key k and returns (h, isLink), where h is a handle and isLink is a boolean value indicating whether h is a link to a sibling of X.

FIG. 4 is a flowchart of a procedure entitled GetNextHandle. This procedure takes an index node X and a key k and returns (h, isLink), where h is a handle referring to a child or sibling of X that is closer in the tree to the data node containing the key k and its associated data value, and isLink is a boolean value indicating whether h is a link to a sibling of X. As shown in FIG. 4, this procedure begins at an entry point for GetNextHandle(X, k) 402. At step 404, the procedure determines whether k is less than or equal to $X.k_{min}$, where $X.k_{min}$ refers to the field $k_{min}$ of index node X. If so, the procedure returns ($X.h_{left}$, true), indicating that the left sibling of X is closer to the desired data node. If not, the procedure determines whether k is greater than $X.k_{max}$, and if so, returns ($X.h_{right}$, true), indicating that the right sibling of X is closer to the desired data node (Step 410). If k is not greater than $X.k_{max}$, as determined at step 408, the procedure determines whether Num(X) is equal to 0 (step 412), and if so, at step 414 returns ($X.h_0$, false). Moving on to step 416, the procedure determines whether $X.k_{n-1}$ is less than k. If so, the procedure at step 418 returns ($X.h_n$, false). If not, the procedure moves on to step 420 and finds the smallest i such that k is less than or equal to $X.k_i$. Next, at step 422, the procedure tests whether IsLeaf(X) is true. If so, it returns ($X.h_{i+1}$, false) (Step 424), and if not, it returns ($X.h_i$, false) (Step 426). In sum the procedure of FIG. 4 returns a handle and a boolean flag indicating whether the handle is a link to a sibling of node X.

Figure 5:
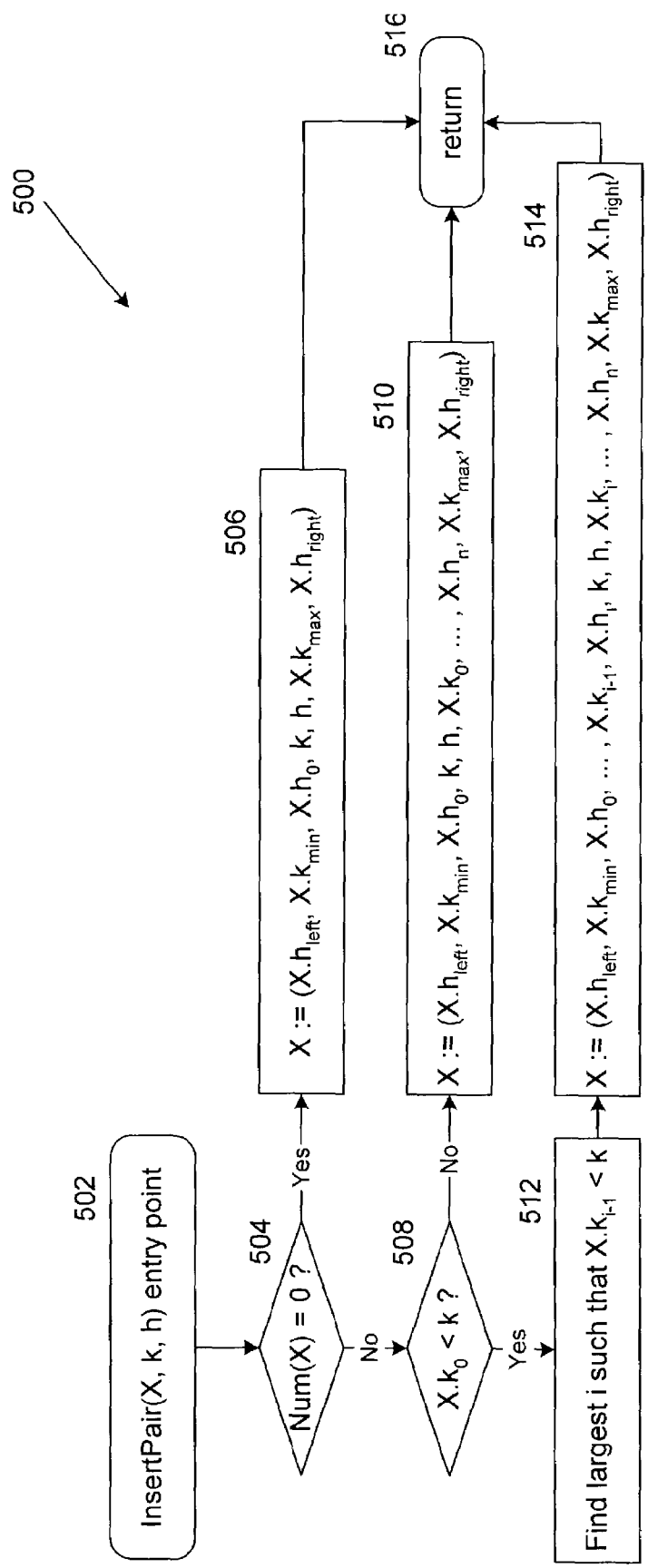
FIG. 5 is a flowchart of a procedure, InsertPair, which takes an index node X, a key k, and a handle h and inserts a key-handle pair into X.

FIG. 5 is a flowchart of a procedure entitled InsertPair, which takes an index node X, a key k, and a handle h and inserts the key k and the handle h into X. This procedure returns nothing.

As shown in FIG. 5, the procedure begins at the entry point InsertPair(X, k, h) (Step 502). Next, at step 504, the procedure determines whether Num(X) is equal to 0. If so, at step 506, the key k and handle h are inserted into the node X as shown. If Num(X) is not equal to 0, at step 508 the procedure determines whether $X.k_0$ is less than k; and if not, proceeds to step 510 where the key k and handle h are inserted into the node X as shown. On the other hand, if the procedure determines that $X.k_0$ is less than k, it proceeds to step 512 where it finds the largest i such that $X.k_{i-1}$ is less than k, and then at step 514 inserts the key k and handle h into node X as shown. Finally, at step 516 the procedure returns. In sum, the key k and handle h are inserted into the node X at steps 506, 510, or 514, depending on whether Num(X) is equal to 0, and whether $X.k_0$ is less than k.

Figure 6:
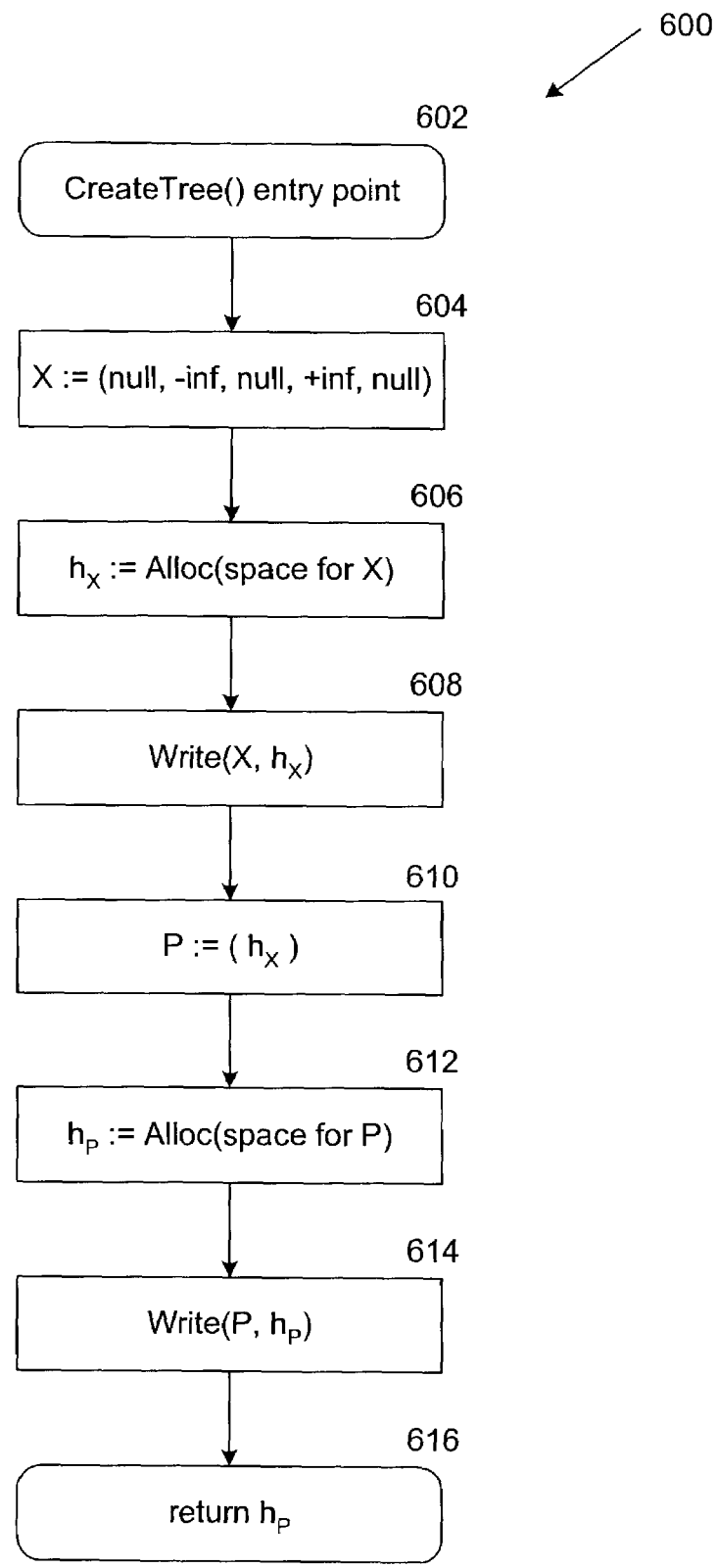
FIG. 6 is a flowchart of a procedure, CreateTree, which returns a prime node handle $h_p$ identifying a new tree.

FIG. 6 is a flowchart of a procedure entitled CreateTree. This procedure receives no argument and returns a prime node handle $h_p$ identifying a new tree. As shown, the CreateTree procedure 600 begins at the entry point CreateTree( ) (step 602). At step 604, the node X is defined as (null, −inf, null, +inf, null). At step 606, the handle h, is defined as Alloc(space for X) where the function Alloc( ) allocates a block of a size given by the argument and returns a handle to the block. Next, at step 608 the procedure invokes Write(X, $h_x$), in order to write the node X to the block referenced by the handle $h_x$. At step 610 the procedure defines the prime node P to contain the handle $h_x$. At step 612 the procedure again invokes the function Alloc(space for P), in order to allocate a block sufficiently large to store P, which returns a handle $h_p$ to the block. At step 614, the procedure writes the node P to the block referenced by the handle $h_p$, and at step 616 the procedure concludes by returning the handle $h_p$. In sum, this procedure returns a prime node handle $h_p$ identifying a new tree.

FIG. 7 is a flowchart of a procedure entitled Lookup, which takes a prime node handle $h_p$ and a key k and returns a data item d or null. The Lookup procedure 700 begins at the entry point Lookup($h_p$, k) (step 702). At step 704, the procedure invokes the function Read($h_p$) in order to read the block referred to by the handle $h_p$. The Read function returns (v, P), the block's version number v and the prime node P stored in the block. Next, at step 706, the handle h is defined as the last handle in the prime node P, thereby referring to the root node of the tree. At step 708, the procedure again invokes the function Read( ) in order to read the block referred to by handle h. This time, the function returns the version number v and the index node X stored in the block referenced by handle h. At step 710, the procedure determines whether h.v (i.e., the version number of handle h) is equal to v. If not, the procedure loops back as shown to step 704. If so, the procedure proceeds to step 712 where the function GetNextHandle (described above in connection with FIG. 4) is invoked. In this instance, the function GetNextHandle(X, k) returns the handle h and boolean isLink indicating whether the handle h is a link to a sibling of node X. Next, at step 714, the procedure tests whether handle h is null. If so, the procedure proceeds to step 716 where null is returned. If not, the procedure proceeds to step 718, where it determines whether both IsLeaf(X) and not isLink are true. If they are not both true, the procedure loops back to step 708 as shown. If, on the other hand, IsLeaf(X) and not isLink are both true, the procedure proceeds to step 720 where the function Read(h) is invoked in order to read the block referred to by handle h and thereby determine the block's version number v and the data node D stored in the block. Next, at step 722, the procedure determines whether h.v (i.e., the version number of handle h) is equal to v. If not, the procedure loops back to step 704 as shown, and if so, proceeds to step 724. At step 724, the procedure determines whether D.k is equal to k (i.e., whether the key of data node D is equal to k). If not, the procedure proceeds to step 726 where it returns null, and if so, it proceeds to step 728 and returns D.d, that is, the data portion of the data node D. Thus, in sum, the Lookup procedure takes a prime node handle $h_p$ and a key k and returns a data item d or null.

Figure 8:
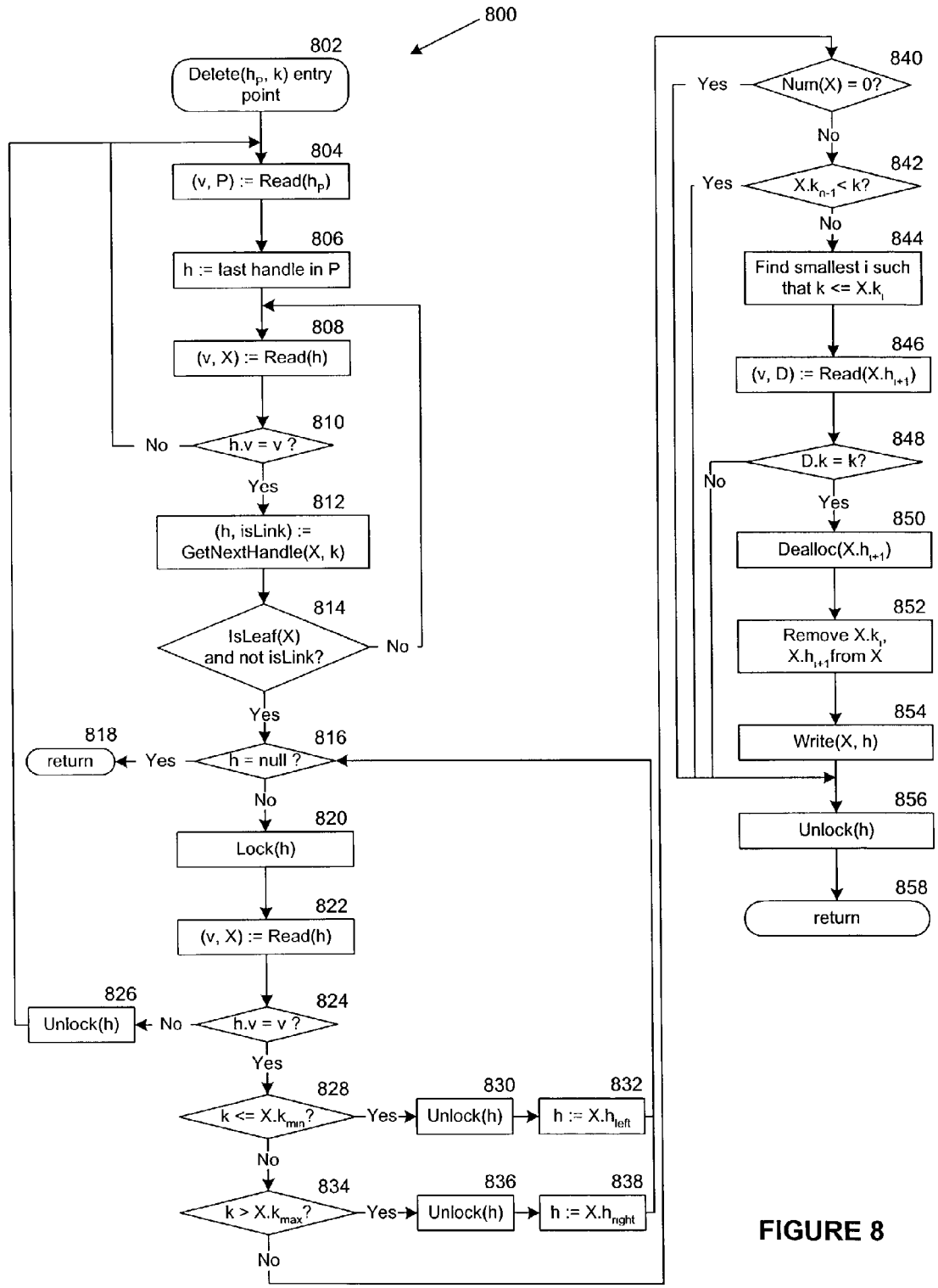
FIG. 8 is a flowchart of a procedure, Delete, which takes a prime node handle $h_p$ and a key k and deletes the key and its associated data value from the tree identified by $h_p$.
Figure 9A:
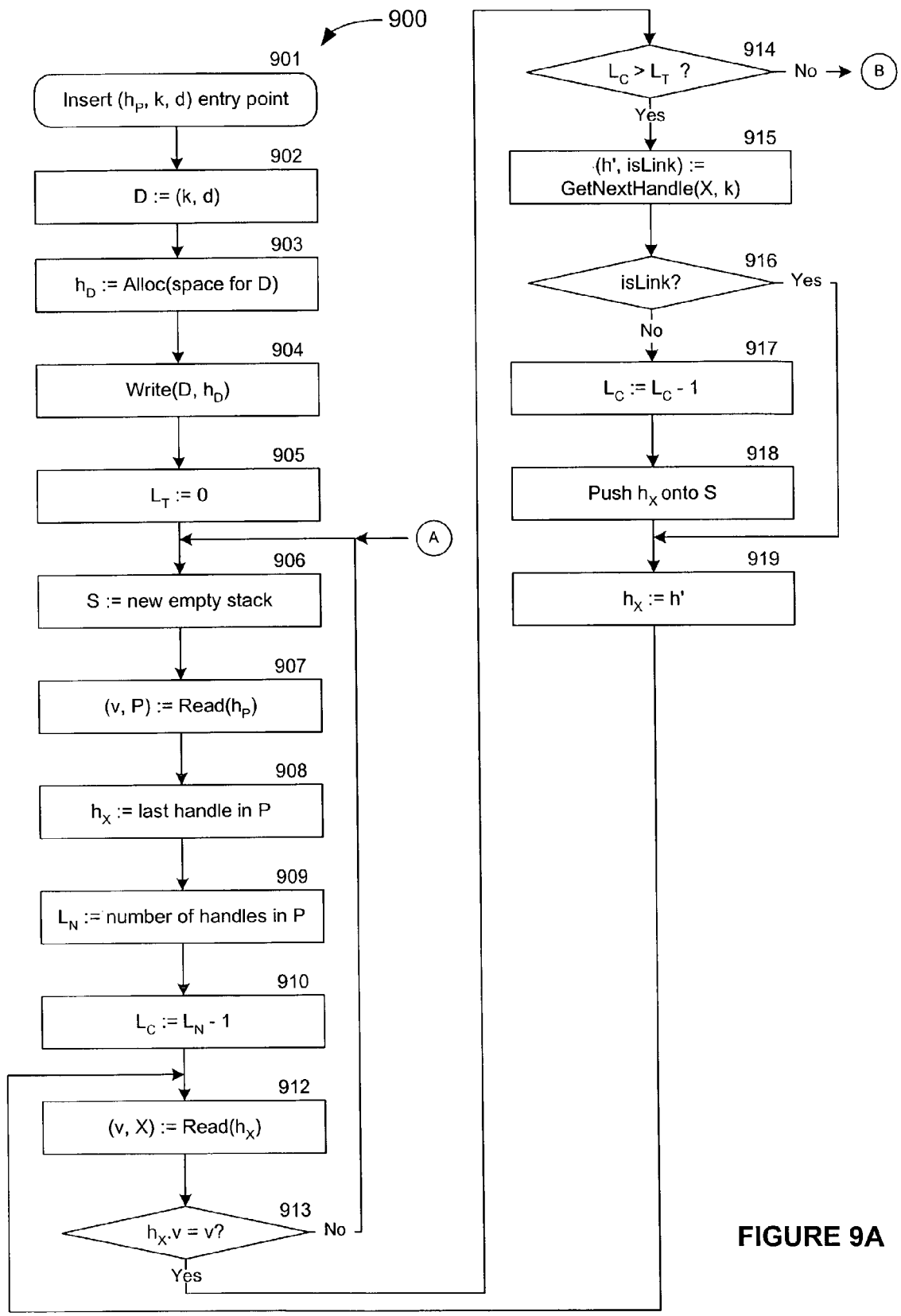
FIG. 9, made up of subparts 9A–9E, is a flowchart of a procedure, Insert, which takes a prime node handle $h_p$, a key value k, and a data value d and inserts the key value and the data value into the tree identified by $h_p$.
Figure 9B:
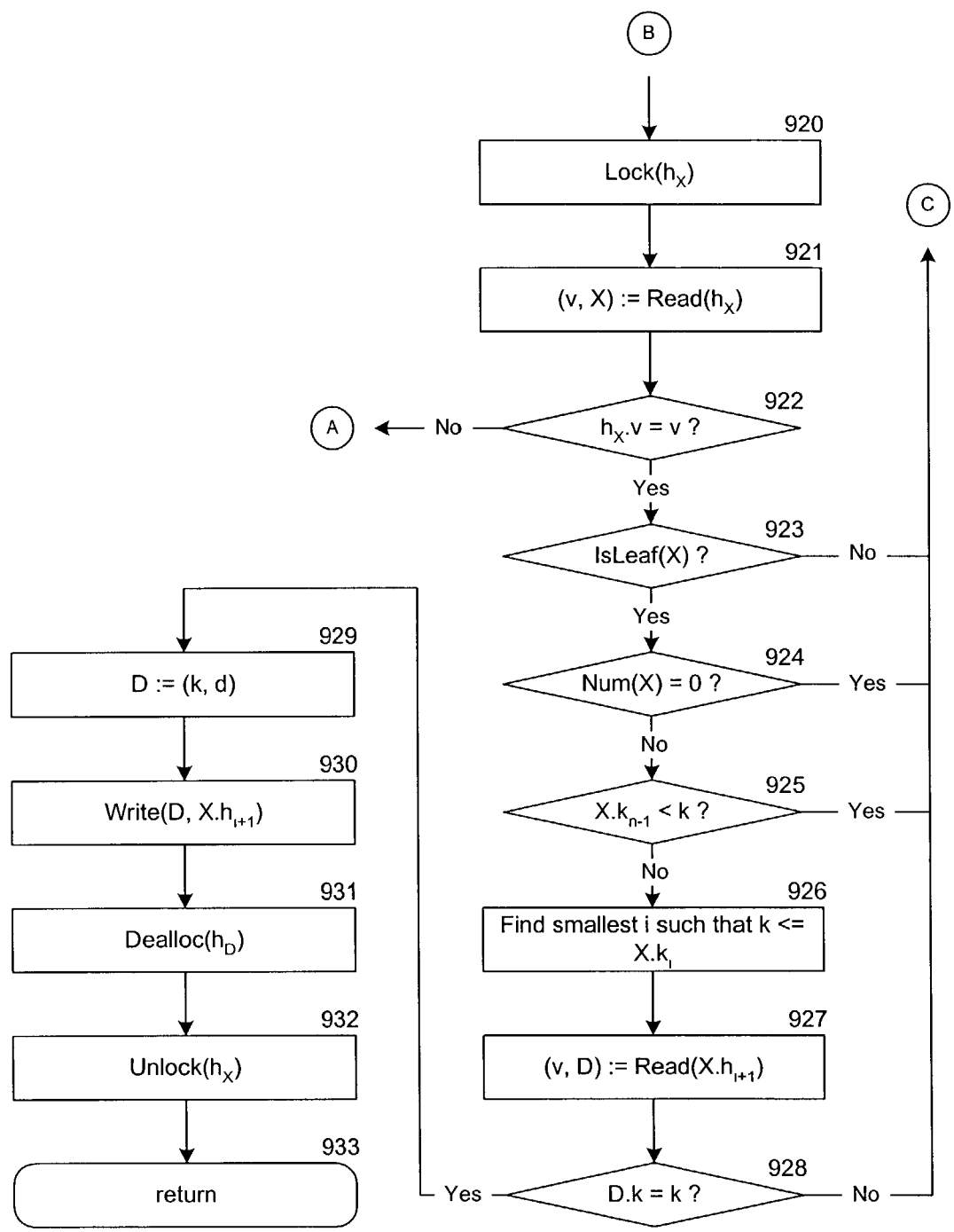
Figure 9C:
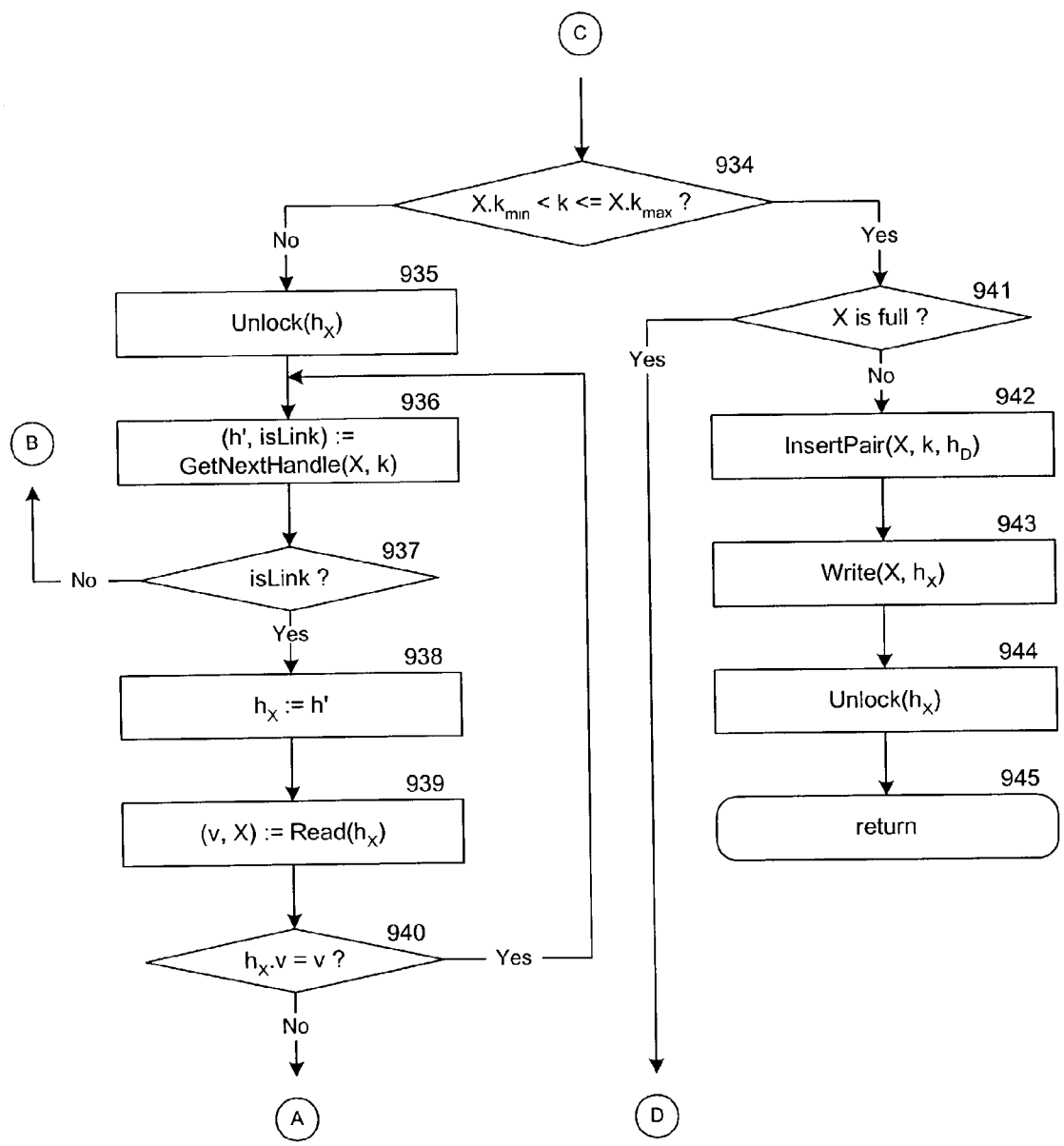
Figure 9D:
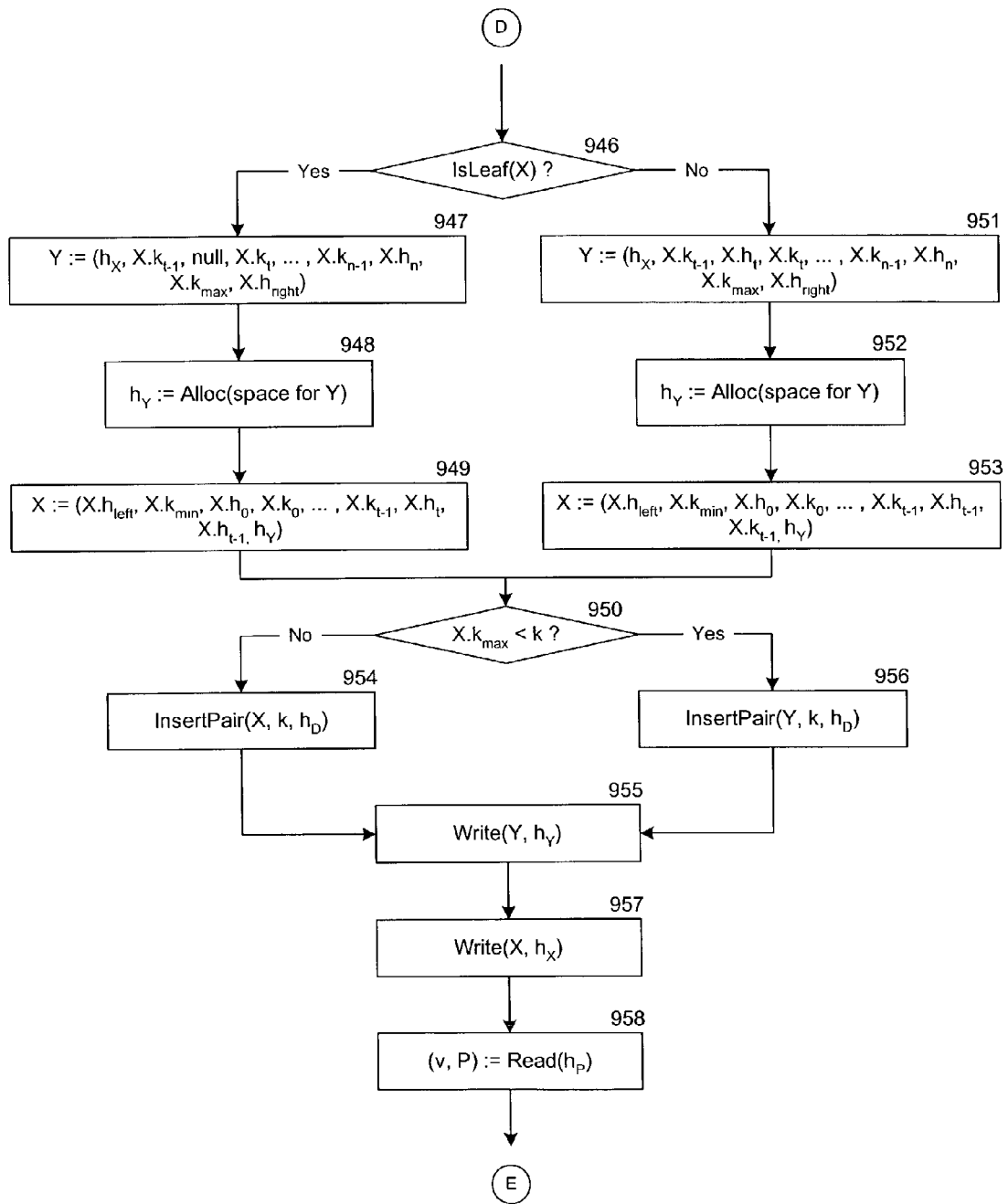
Figure 9E:
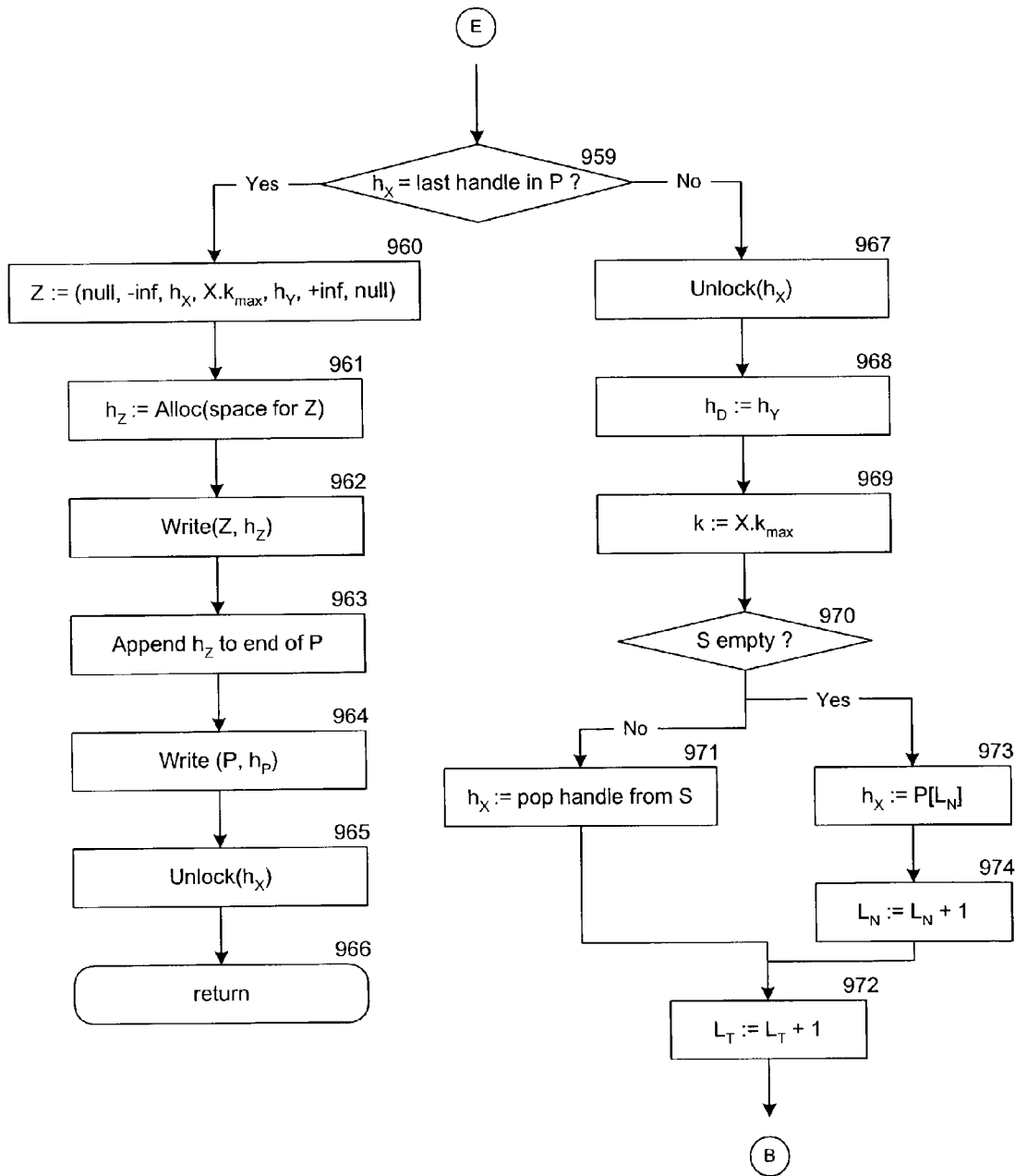

FIG. 8 is a flow chart of a procedure entitled Delete which takes a prime node handle $h_p$ and a key k, and deletes the key and its associated data value from the tree identified by the handle $h_p$. This procedure returns nothing.

As shown, the Delete procedure 800 begins at the entry point Delete($h_p$, k) (step 802). Next, at step 804, the procedure invokes the function Read($h_p$) in order to read the block referred to by the handle $h_p$. This function returns the block's version number v and the prime node P stored in the block. Next, at step 806 the handle h is defined as the last handle in node P, thereby referring to the root node of the tree. At step 808, the procedure again invokes the Read( ) function in order to read the block referred to by handle h, returning the block's version number and the index node X contained therein. At step 810, the procedure tests whether h.v is equal is equal to v, i.e., whether the version number of handle h is equal to the version number returned by the previous invocation of Read( ). If not, the procedure loops back to step 804 as shown; and if so, it proceeds to step 812. At step 812 the function GetNextHandle (discussed above in connection with FIG. 4) is invoked with the arguments X, k. In this manner, the procedure determines the handle h and the boolean isLink indicating whether the handle h is a link to a sibling of node X. Next, at step 814, the procedure tests whether IsLeaf(X) and not isLink are both true; if not, the procedure loops back to step 808, and if so, proceeds to step 816. At step 816, the procedure tests whether handle h is null, and if so, proceeds to step 818 where it returns. If h is not null, the procedure proceeds to step 820 where the function Lock(h) is invoked in order to lock the block referred to by the handle h. Next, at step 822 Read(h) reads the block referred to by handle h, returning the block's version number and the index node X contained therein. At step 824 the procedure tests whether h.v is equal to v, and if not, proceeds to step 826 where the block referred to by the handle h is unlocked, after which the procedure loops back to step 804 as shown. On the other hand, if h.v is equal to v, the procedure proceeds to step 828 (see subpart 8B of FIG. 8), where the procedure determines whether key k is less than or equal to $X.k_{min}$, i.e., whether the key k is found in a data node attached to one of the left siblings of X. If so, the procedure proceeds to steps 830 and 832, where the block referred to by handle h is unlocked and then the handle h is defined as the left sibling handle of node X. If key k is not less than or equal to $X.k_{min}$, the procedure proceeds to step 834 where it tests whether k is greater than $X.k_{max}$, and if so, proceeds to steps 836 and 838, where it unlocks the block referred to by handle h and defines h to be the right sibling handle of node X. If at step 834 the procedure determines that k is not greater than $X.k_{max}$, it proceeds to step 840 where it tests whether Num(X) is equal to 0, meaning that X (which is a leaf-level index node) has no children, and that it therefore does not contain the key k. If the answer to this test is yes, the procedure moves ahead to step 856, and if it is no, it proceeds to step 842. At step 842, the procedure determines whether $X.k_{n-1}$ is less than k, i.e., whether the field $k_{n-1}$ of node X is less than the key value k. If it is, the procedure jumps ahead to step 856 as shown, and if it is not, it proceeds to step 844, where it finds the smallest i such that k is less than or equal to $X.k_i$. Next, at step 846, the procedure invokes Read($X.h_{i+1}$), reading a block containing a data node D and a version number v. Next, at step 848 the procedure tests whether D.k is equal to k. If it is not, the procedure jumps to step 856, and if so, it proceeds to step 850 where it deallocates the block referred to by the handle $X.h_{i+1}$, which increments the block version number. Next, at step 852 the procedure removes the handles identified by $X.k_i$ and $X.h_{i+1}$ from node X. At step 854, the Write( ) function is invoked to write the node X referenced by handle h. Finally, at steps-856 and 858 the block referred to by handle h is unlocked and the procedure returns. In sum, the Delete procedure takes a prime node handle $h_p$ and a key k and removes the key k and its associated data value from the tree identified by $h_p$.

FIG. 9 is a flowchart of a procedure entitled Insert, which takes a prime node handle $h_p$, a key value k, and a data value d and inserts the key and the data value into the tree identified by $h_p$. The Insert function 900 begins at the entry point identified by reference numeral 901, and is invoked by the call Insert($h_p$, k, d), where $h_p$ is a prime node handle, k is a key value, and d is a data value. At step 902, the Data node D is defined by the key value k and data value d. At step 903, the Alloc function is invoked so as to allocate a block large enough to contain D; and the handle identifying the block is assigned to $h_D$. Next, at step 904 the procedure writes the node D to the block referenced by handle $h_D$. At step 905, $L_T$ is set to 0 and then at step 906 S is defined as the new empty stack. (By way of providing further background, we note that the levels of a tree are the sets of siblings. In the terminology used in the instant application, level 0 contains all leaf index nodes, level 1 contains their parents, and so on; the highest level contains the root node. The number of the highest level is one less than the number of handles in a prime node (since we use zero-based indexing). The "target level" variable $L_T$ identifies the level at which the key-handle pair (k, $h_D$) shall be inserted into the tree. Setting $L_T$ to 0 means that the pair shall be inserted into a leaf index node. As the algorithm unfolds, $L_T$ may be incremented, indicating that a (modified) key-handle pair shall be inserted into an index node higher up in the tree (potentially all the way up to the root.) At step 907, the Read( ) function is invoked to read the block referred to by handle $h_p$ so as to identify the version number v and the prime node P stored in the block. At step 908, the last handle in node P (the root index node) is assigned to $h_x$. At step 909 $L_N$ is defined to be the number of handles in node P, which is identical to the number of index node levels in the tree. At step 910, $L_C$ is defined as $L_N-1$. $L_C$ (the "current level") is the level the insert procedure is currently at. Since Insert starts at the root (which is at level $L_N-1$, as explained above), $L_C$ is initialized to this value, and is decremented as Insert descends into the tree. At step 912 Read($h_x$) is invoked to return the version number v and the index node X referred to by handle $h_x$. At step 913, the procedure tests whether $h_x.v$ is equal to v, and at step 914 the procedure tests whether $L_C$ is greater than $L_T$. If the answer to both of the tests of steps 913 and 914 is yes, the procedure proceeds to step 915. If, on the other hand, the answer to step 913 is no, the procedure loops back to step 906 as shown. If the answer to the test of step 914 is no, the procedure proceeds to step 920 (see subpart 9B of FIG. 9).

At step 915, the procedure invokes the GetNextHandle function with the arguments X and k, whereby the handle h' and boolean isLink are returned. As discussed previously, the boolean isLink indicates whether the handle h' is a link to a sibling of node X. At step 916, the procedure tests whether isLink is true, and if it is, branches ahead to step 919. If isLink is false, the procedure proceeds to step 917, where it decrements $L_C$. At step 918, the procedure pushes the handle $h_x$ onto stack S. At step 919, the function assigns the value of h' to $h_x$.

Now referring to subpart 9B of FIG. 9, at step 920 the procedure invokes the Lock( ) function in order to lock the block referred to by the handle $h_x$. At step 921 the procedure invokes Read($h_x$), which reads the block identified by handle $h_x$ and extracts an index node X and a version number v. At step 922, the procedure tests whether $h_x.v$ is equal to v. If not, it branches to step 906 (subpart 9A) as shown. If, on the other hand, $h_x.v$ is equal to v, the procedure proceeds to step 923, where it tests whether the function IsLeaf(X) is true. If not, the procedure branches to step 934 (subpart 9C of FIG. 9), and if so, it proceeds to step 925, where it tests whether $X.k_{n-1}$ is less than k. If the answer to the test of step 925 is yes, the procedure branches to step 934, and if it is no, the procedure proceeds to step 926. At step 926, the procedure finds the smallest i such that k is less than $X.k_i$. At step 927, the procedure invokes Read($X.h_{i+1}$), which reads the block identified by handle $X.h_{i+1}$ and extracts a data node D and a version number v. At step 928, the procedure tests whether D.k is equal to k; if it is, the procedure proceeds to step 929, and otherwise it branches to step 934. At step 929, the procedure defines node D to be a data node containing the key value k and data value d. Next, at step 930 the function Write (D, X.$h_{i+1}$) is invoked in order to write the node D to the block referenced by the handle $h_{i+1}$. Next, at step 931, the function Dealloc($h_D$) is invoked in order to deallocate the block referred to by the handle $h_D$ and increment the block's version number. At step 932, the block referred to by the handle $h_X$ is unlocked, and then at step 933 the procedure returns.

Referring now to subpart 9C of FIG. 9, at step 934 the procedure tests whether k is greater than X.$k_{min}$ and less than or equal to X.$k_{max}$. If the answer to the test of step 934 is yes, the procedure proceeds to step 941; if the answer is no, the procedure proceeds to step 935. At step 935, the block referred to by the handle $h_X$ is unlocked, and then at step 936 the GetNextHandle function is invoked with the arguments X and k, which thereby returns the handle h' and the boolean isLink. As discussed previously, this function returns the handle h' and the boolean isLink indicating whether this handle is a link to a sibling of node X. At step 937, the procedure tests whether isLink is true; if so, it proceeds to step 938 and if not, it branches to step 920 (see subpart 9B of FIG. 9). At step 938, the handle $h_X$ is assigned the value of h' and then at step 939 Read($h_X$) is invoked to determine the version number v and node X referred to by the handle $h_X$. At step 940, the procedure tests whether $h_X$.v is equal to v; if so, it branches back to step 936 as shown, and if not, it branches to step 906 (subpart 9A of FIG. 9).

As mentioned above, at step 934 the procedure tests whether k is greater than X.$k_{min}$ and less than or equal to X.$k_{max}$. If the answer to this test is yes, the procedure proceeds to step 941 where it tests whether node X is full. If X is full, the procedure proceeds to step 946 (subpart 9D of FIG. 9), otherwise it proceeds to step 942. At step 942, the procedure invokes InsertPair(X, k, $h_D$), in order to insert the key k and handle $h_D$ in node X. At step 943, Write(X, $h_X$) is invoked in order to write the node X to the block referenced by the handle $h_X$. At step 944, the block referred to by the handle $h_X$ is unlocked, and then at step 945 the procedure returns.

Referring now to subpart 9D of FIG. 9, if node X is full, then X is split into two nodes X and Y. At step 946 the procedure tests whether the function IsLeaf(X) is true. If it is, the procedure proceeds to step 947, and if it is not, the procedure proceeds to step 951. Steps 947, 948 and 949, on the one hand, and steps 951, 952 and 953 on the other hand are performed in order to define nodes Y and X, depending on whether X is a leaf or not. Steps 947 and 951 are performed in order to define the node Y, steps 948 and 952 are performed to allocate space for Y, and steps 949 and 953 are performed to define the node X. At step 950, the procedure tests whether X.$k_{max}$ is less than key value k. If not, the procedure proceeds to step 954 where the function InsertPair (discussed above in connection with FIG. 5) is invoked with the arguments X, k and $h_D$ to insert k and $h_D$ into X. In step 955, Write(Y,$h_y$) is invoked in order to write the node Y. Similarly, at step 957 Write(X, $h_x$) is invoked in order to write the node X. If at step 950 it is determined that X.$k_{max}$ is less than k, the procedure proceeds to step 956 where the function InsertPair(Y, k, $h_D$) is invoked to insert k and $h_D$ into Y, after which steps 955 and 957 are performed as described above. At step 958, Read($h_P$) is invoked and this function returns the version number v and the prime node P in the block referred to by the handle $h_P$.

The procedure then proceeds to step 959 (see subpart 9E of FIG. 9).

Referring to subpart 9E of FIG. 9, at step 959 the procedure determines whether handle $h_x$ is the last handle in prime node P, meaning that the node identified by $h_x$ is the root of the tree. If so, the procedure proceeds to steps 960 through 966 and if not, proceeds to steps 967 through 972. At step 960 the procedure defines the index node Z as shown. At step 961 the handle $h_z$ is defined with the function Alloc(space for Z), in order to allocate a block large enough to hold Z and return a handle to the block. In other words, the handle $h_z$ is returned by the function Alloc( ). At step 962 the function Write(Z, $h_z$) is invoked in order to write the index node Z to the block referenced by the handle $h_z$. At step 963, the procedure appends $h_z$ to the end of prime node P. At step 964, Write(P, $h_p$) is invoked to write the node P to the block referenced by the handle $h_p$. Next, at step 965 the block referred to by the handle $h_x$ is unlocked and then at step 966 the procedure returns.

If at step 959 the answer to the test whether $h_x$ is the last handle in P is no, the procedure proceeds to step 967, wherein the block referred to by the handle $h_x$ is unlocked. Then, at step 968, the handle $h_D$ is set to $h_y$. At step 969 the key value k is set to X.$k_{max}$. At step 970, the procedure determines whether the stack S is empty; if not, it proceeds to step 971 wherein the handle $h_x$ is defined from the last value on the stack S. On the other hand, if S is empty, the procedure proceeds to step 973 where handle $h_x$ is defined with P[$L_N$], and then at step 974 $L_N$ is defined as $L_N$+1. Finally, at step 972 $L_T$ is set to $L_T$+1, and then the procedure loops back to step 920 (see subpart 9B of FIG. 9), as shown.

In sum, the Insert procedure of FIG. 9 (subparts 9A through 9E), takes a prime node handle $h_P$, a key value k, and a data value d and inserts the key-data pair into the tree identified by $h_P$.

Figure 10:
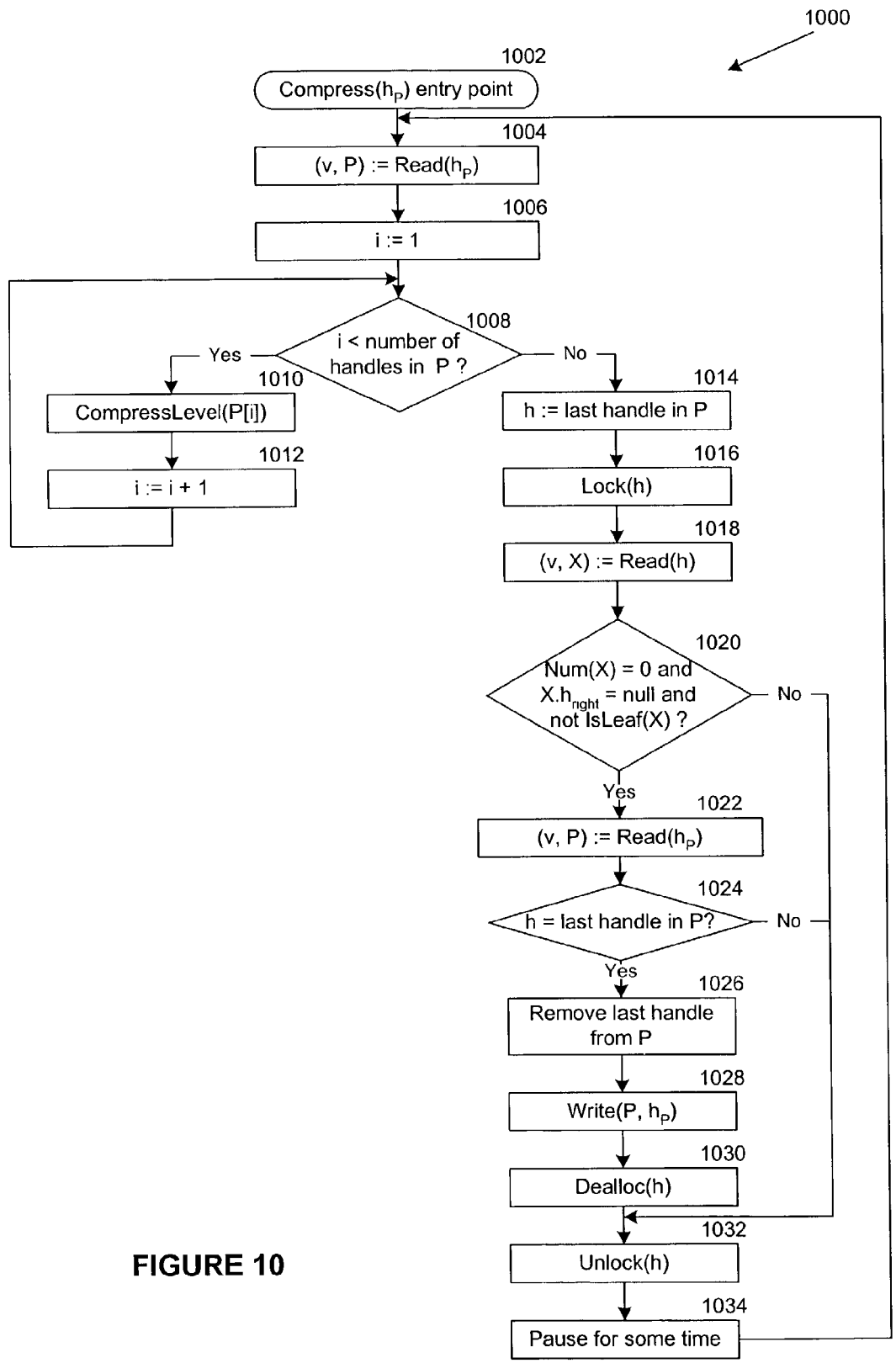
FIG. 10 is a flowchart of a background procedure, Compress, that takes a prime node handle $h_p$ and compresses the tree identified by $h_p$.

FIG. 10 is a flowchart of a procedure entitled Compress. This procedure takes a prime node handle $h_P$ and compresses the node; it does not return, as it is executed by a background process. The Compress procedure 1000 begins at an entry point 1002 with the call Compress($h_P$). At step 1004, Read ($h_P$) is invoked, and this function returns a version number v and the prime node P referred to by the handle $h_P$. At step 1006, the index i is set to 1. At step 1008, the procedure tests whether the number of handles in node P is greater than i. If the number of handles in P is greater than i, the procedure proceeds to step 1010 to cause the function CompressLevel with the argument P[i]. This function is described below in connection with FIG. 11. Briefly, CompressLevel( ) is a function that takes an index node handle $h_X$ and compressed the index node referred to by that handle and all its right siblings. In step 1012, the index i is set to i+1, and then the procedure loops back to decision step 1008. At step 1008 if it is determined that the number of handles in P is not greater i, the procedure proceeds to step 1014, where the handle h is set to the last handle in node P. Next, at step 1016, the block referred to by the handle h is locked, and then at step 1018 Read(h) is invoked, and this function returns the version number v and node X referred to by handle h. Next, at step 1020, the procedure tests whether Num(X) is equal to 0 and X.$h_{right}$ is equal to null and not IsLeaf(X) are all true. If so, the procedure proceeds to step 1022 and invokes Read($h_P$), which returns the version number v and prime node P. If the answer to the test at step 1020 is no, the procedure jumps ahead to step 1032 and unlocks the block referred to by handle h. After step 1022 is performed, the procedure moves on to step 1024 and tests whether h is the last handle in P (that is, if h refers to the root node of the tree); if not, the procedure jumps ahead to step 1032, and if so, proceeds to step 1026. At step 1026 the procedure removes the last handle from P, and at step 1028 writes the node P referenced by the handle $h_P$. Next, at step 1030, the procedure deallocates the block referred to by handle h, and then proceeds to step 1032, where it unlocks the block referred to by handle h. Finally at step 1034, the procedure pauses and then loops back to step 1004, as shown. In sum, this procedure compresses the tree identified by handle $h_P$.

The CompressLevel procedure 1100 begins at an entry point 1101 with the call CompressLevel($h_X$). At step 1102, the variable a is set to 0 and at step 1103, the handle $h_A$ is set to null. Next, at step 1104 the procedure tests whether the handle $h_X$ is null, and if so, proceeds to step 1 105 where the procedure returns. If $h_X$ is not null, the procedure proceeds to step 1106 and locks the block referred to by handle $h_X$. Next, at step 1107, Read($h_X$) is invoked to read index node X and its version number v. At step 1108, the procedure tests whether handle $h_A$ is null. If $h_A$ is null, the procedure branches to block 115 (subpart 11B of FIG. 11), and if $h_A$ is not null, the procedure proceeds to step 1109 where variable a is set to −1. Next, at step 1110, index i is set to zero, and then at step 1111 the procedure tests whether Num(X) is greater than or equal to i, i.e., the procedure tests whether the number n returned by the function Num(X) is greater than or equal to index i. If it is not, the procedure branches to step 1115 (subpart 11B of FIG. 11), and if so, proceeds to step 1112. At step 1112; the procedure tests whether the handle to the ith child of node X (i.e., X.$h_i$) is equal to handle $h_A$. If it is not, the procedure proceeds to block 1114 and increments index i and then proceeds back to step 1111. If X.$h_i$ is equal to handle $h_A$ the procedure proceeds to step 1113 where variable a is set to the value of index i.

Figure 11A:
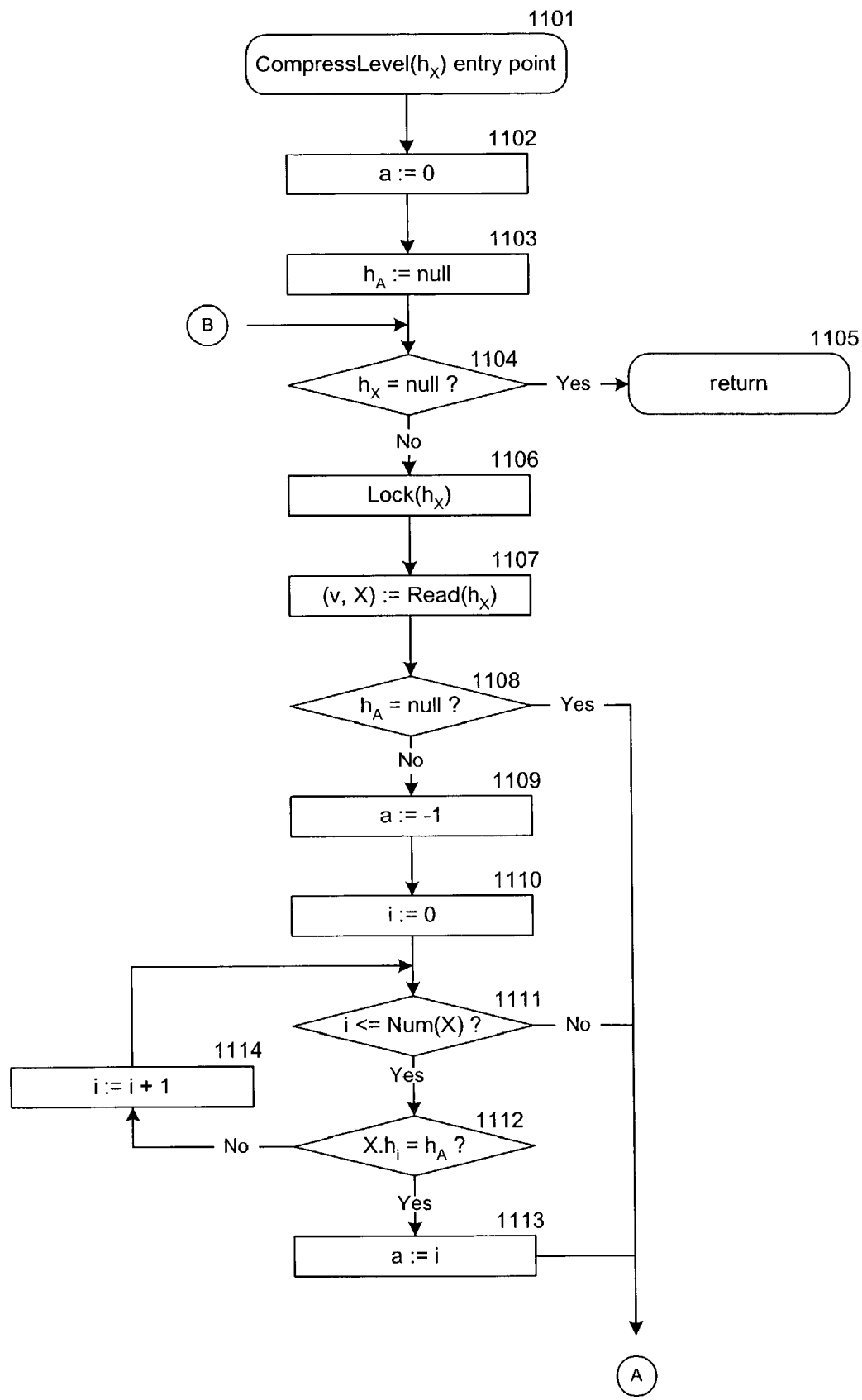
FIG. 11, made up of subparts 11A–11C, is a flowchart of a procedure, CompressLevel, which compresses a level.
Figure 11B:
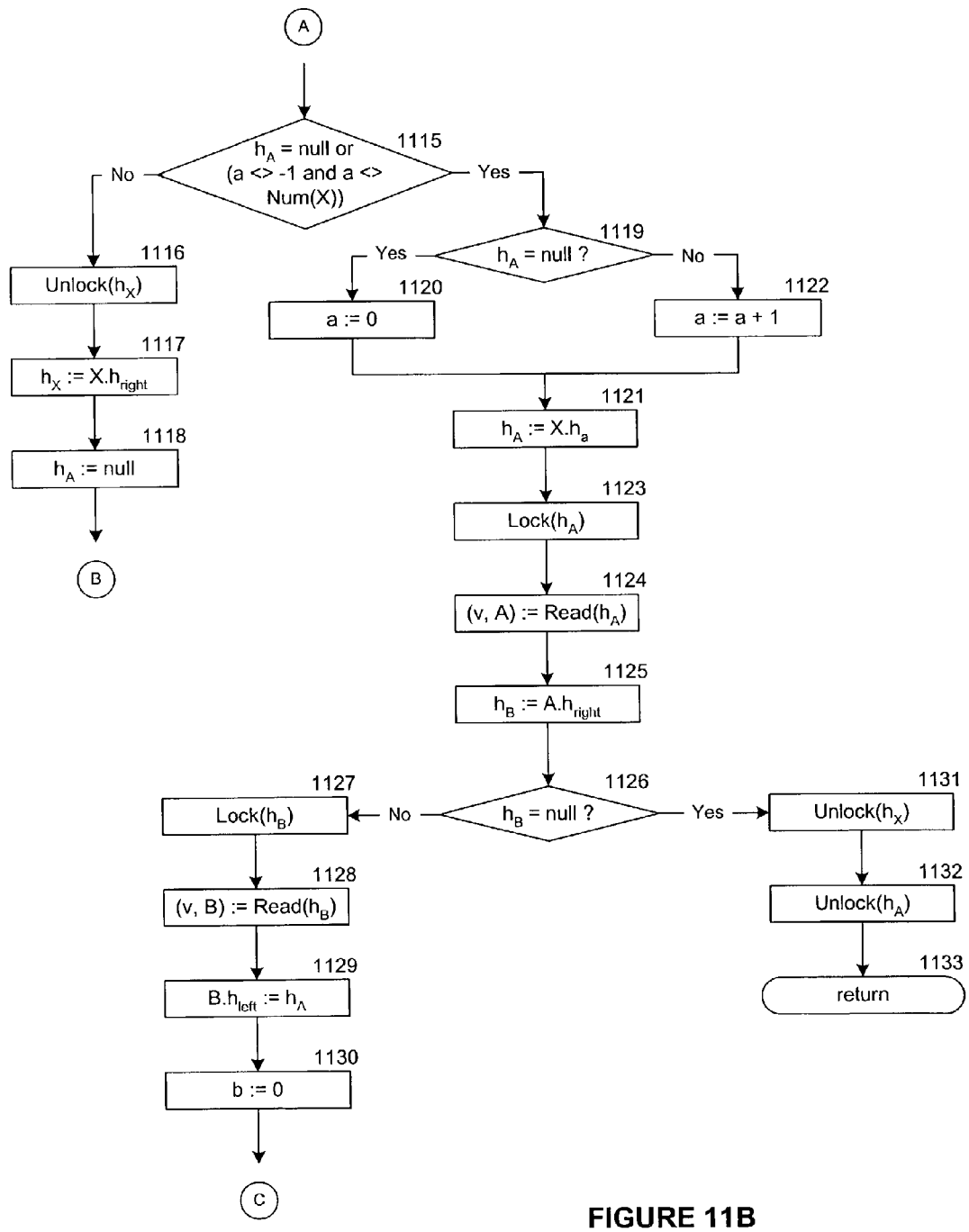
Figure 11C:
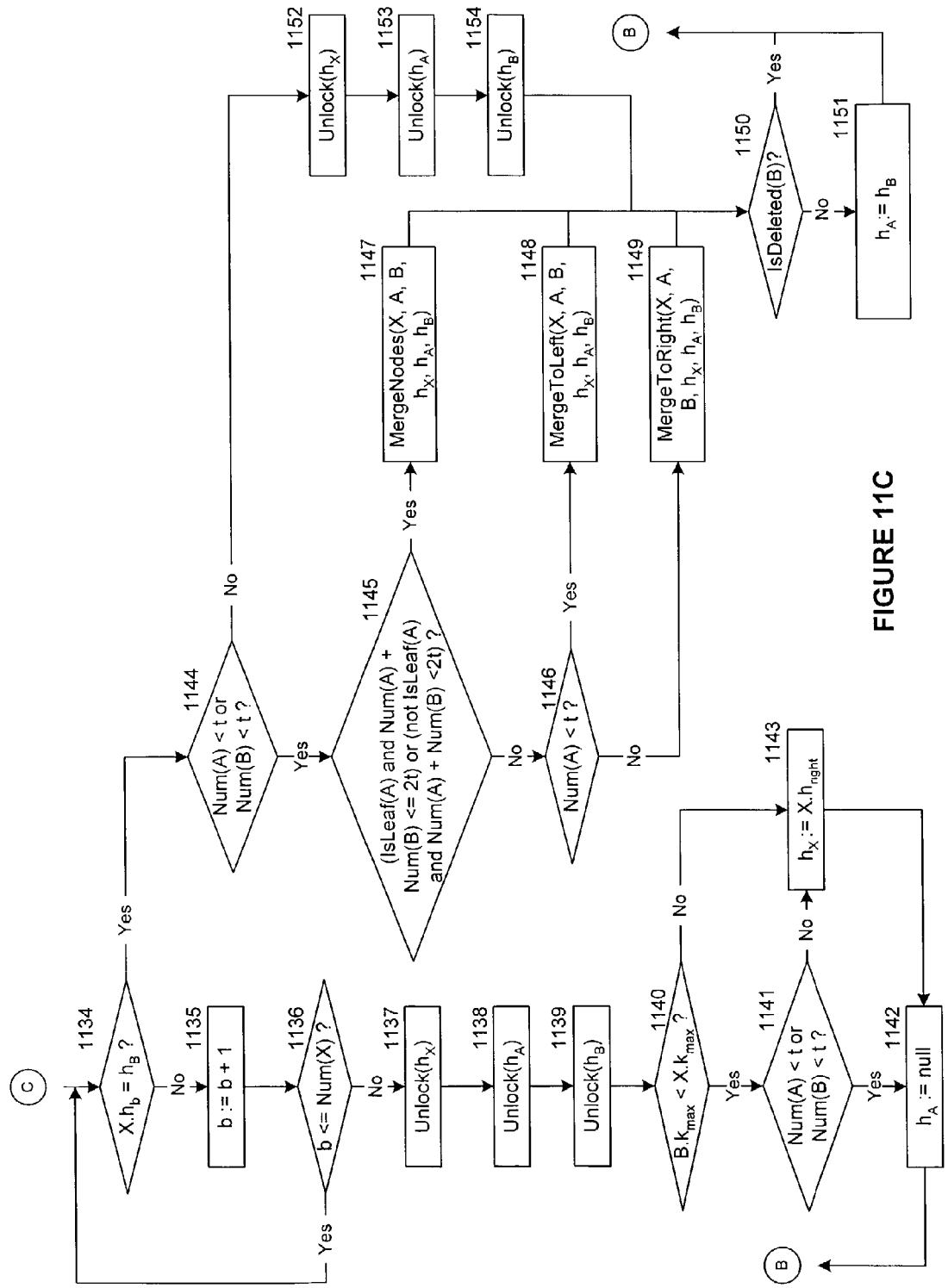

Referring now to subpart 11B of FIG. 11, at step 1115, the procedure tests whether the handle $h_A$ is null or the variable a is neither equal to −1 nor equal to Num(X). If the answer to the test of step 1115 is no, the procedure proceeds to step 1116 through 1118 and then back to step 1104, as shown. Steps 1116 through 1118 are performed to unlock the block referred to by the handle $h_X$, set $h_X$ to the field $h_{right}$ of index node X, and then to set handle $h_A$ to null.

If the answer to the test of step 1115 is yes, the procedure performs a series of steps beginning with step 1119, where it tests whether handle $h_A$ is null. If $h_A$ is null, the procedure at step 1120 sets variable a to 0. If handle $h_A$ is not null, the procedure at step 1122 increments a. Then, at step 1121 handle $h_A$ is set to X.$h_a$. At step 1123, the block referred to by handle $h_A$ is locked, and then at step 1124 the function Read($h_A$) is invoked, to read index node A and its associated version number v. At step 1125, the handle $h_B$ is set to A.$h_{right}$. Next, at step 1126 the procedure tests whether the handle $h_B$ is null. If it is, steps 1131 through 1133 are performed, i.e., the block referred to by handle $h_X$ is unlocked, the block referred to by handle $h_A$ is unlocked, and then the procedure returns. On the other hand, if handle $h_B$ is not null, the procedure proceeds to step 1127, and locks the block referred to by handle $h_B$. Next, at step 1128, Read($h_B$) is invoked to determine the version number v and node B. At step 1129, B.$h_{left}$ is set to the value of handle $h_A$. Next, at step 1130, b is set to 0.

The remaining steps of the CompressLevel procedure are shown in subpart 11C of FIG. 11. Referring to this subpart, at step 1134 the procedure tests whether X.$h_b$ is $h_B$. If so, it proceeds to step 1144; otherwise, it proceeds to step 1135. At step 1135, variable b is incremented, and at step 1136 the procedure tests whether Num(X) is greater than or equal to b. If so, the procedure loops back step 1134 as shown. If not, the procedure proceeds to step 1137 and unlocks the block referred to by handle $h_X$. Next, at step 1138, the procedure unlocks the block referred to by handle $h_A$ and at step 1139 unlocks the block referred to by handle $h_B$. At step 1140 the procedure tests whether B.$k_{max}$ is less than X.$k_{max}$. If not, the procedure performs step 1143, in which handle $h_X$ is set to X.$h_{right}$. If B.$k_{max}$ is less than X.$k_{max}$ as determined at step 1140, the procedure proceeds to step 1141 and tests whether Num(A) is less than t or Num(B) is less than t. If either of these is true, the procedure proceeds to step 1142 and sets handle $h_A$ to null, and then branches back to step 1104 (subpart 11A of FIG. 11) as shown.

At step 1144, the procedure again tests whether Num(A) is less than t or Num(B) is less than t. If not, the procedure proceeds to steps 1152 through 1154 as shown, and from there to steps 1150 and 1151, after which the procedure branches back to step 1104 (subpart 11B of FIG. 11). If the answer to the test of step 1144 is yes, the procedure proceeds to steps 1145, 1146, 1147, 1148, and 1149 as shown (these steps should by now be self-explanatory and are obviously not executed in order). After these steps are performed, the procedure tests whether node B is deleted, and if so, branches back to step 1104. If node B is not deleted, the procedure sets at step 1151 $h_A$ to $h_B$.

Figure 12:
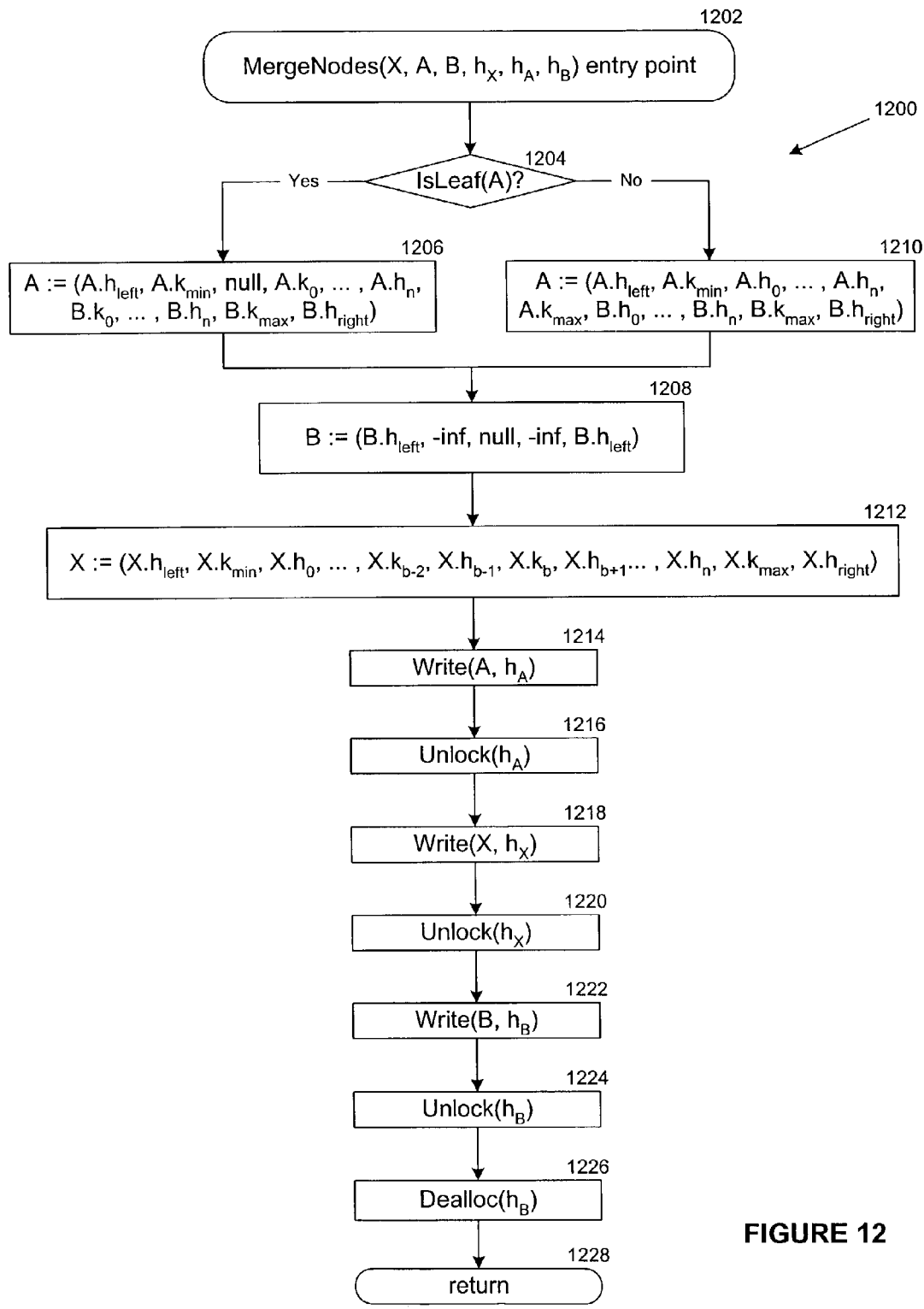
FIG. 12 is a flowchart of a procedure, MergeNodes, which merges two nodes.

FIG. 12 is a flowchart of a procedure entitled MergeNodes. This procedure, as its name implies, merges nodes; it takes index nodes X, A, B, (where A is the left sibling of B and X is their parent) and index node handles $h_X$, $h_A$, and $h_B$ referring to these nodes, and merges the contents of A and B into A, discarding B in the process. The MergeNodes procedure 1200 begins at entry point 1202 and is invoked with the call MergeNodes(X, A, B, $h_X$, $h_A$, $h_B$), as shown. At step 1204, the procedure tests whether IsLeaf(A) is true. Recall that IsLeaf(X) is a function that returns true if, and only if, X.$h_0$ is null. If IsLeaf(A) is true, the procedure performs step 1206, and if it is false, the procedure performs steps 1210. Steps 1206 and 1210 assign the values shown in the corresponding blocks to node A. Next, at step 1208 the procedure performs the operation shown with respect to node B. At step 1212, node X is defined as shown. Steps 1214 through 1228 are then performed to write nodes A, X, and B, unlock handles $h_A$, $h_X$, and $h_B$, and to deallocate index node B identified by handle $h_B$. The procedure returns at step 1228.

Figure 13:
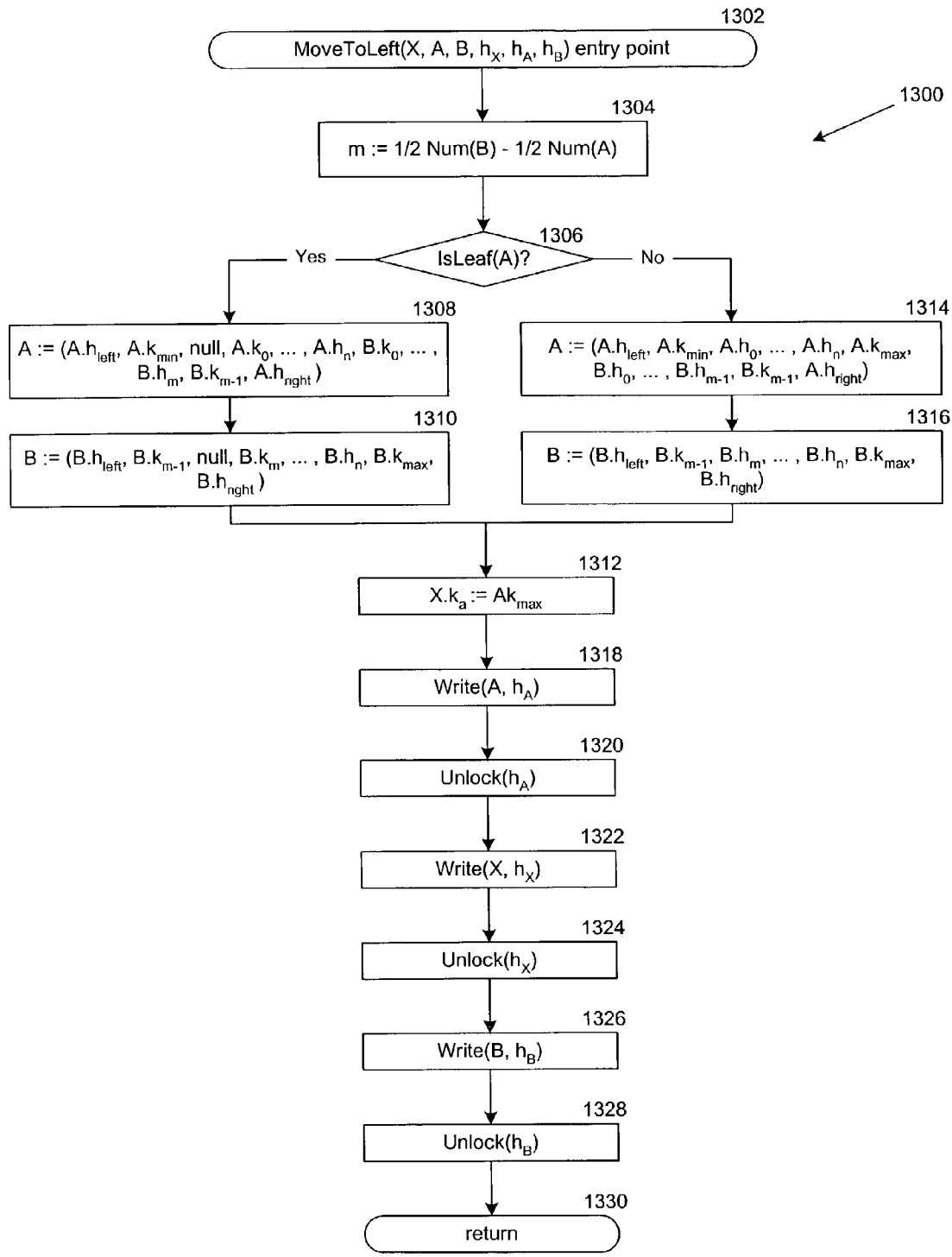
FIG. 13 is a flowchart of a procedure MoveToLeft that moves parts of a node to its left sibling.

FIG. 13 is a flowchart of a procedure entitled MoveToLeft. This procedure is performed in order to move a node to the left is performed in order to move part of the contents of an index node to its left sibling. The MoveToLeft Procedure 1300 begins at entry point 1302 with the call MoveToLeft(X, A, B, $h_X$, $h_A$, $h_B$). At step 1304 the variable m is defined as ½Num(B)−½Num(A). Recall that the function Num(X) returns n where X is an index node ($h_{left}$, $k_{min}$, $h_0$, $k_0$, $h_1$, $k_1$, . . . , $h_{n-1}$, $k_{n-1}$, $h_n$, $k_{max}$, $h_{right}$). Thus, Num(X) returns the integer n, when n is the index of the last child handle of the node X.

At step 1306, the procedure tests whether IsLeaf(A) is true (i.e., whether A.$h_0$ is null). If so, the procedure performs steps 1308 and 1310 as shown; and if not, the procedure performs steps 1314 and 1316. These steps assign the values shown in the corresponding blocks to nodes A and B.

Steps 1312 through 1330 write out and unlock the index nodes A, X and B, and then return.

Figure 14:
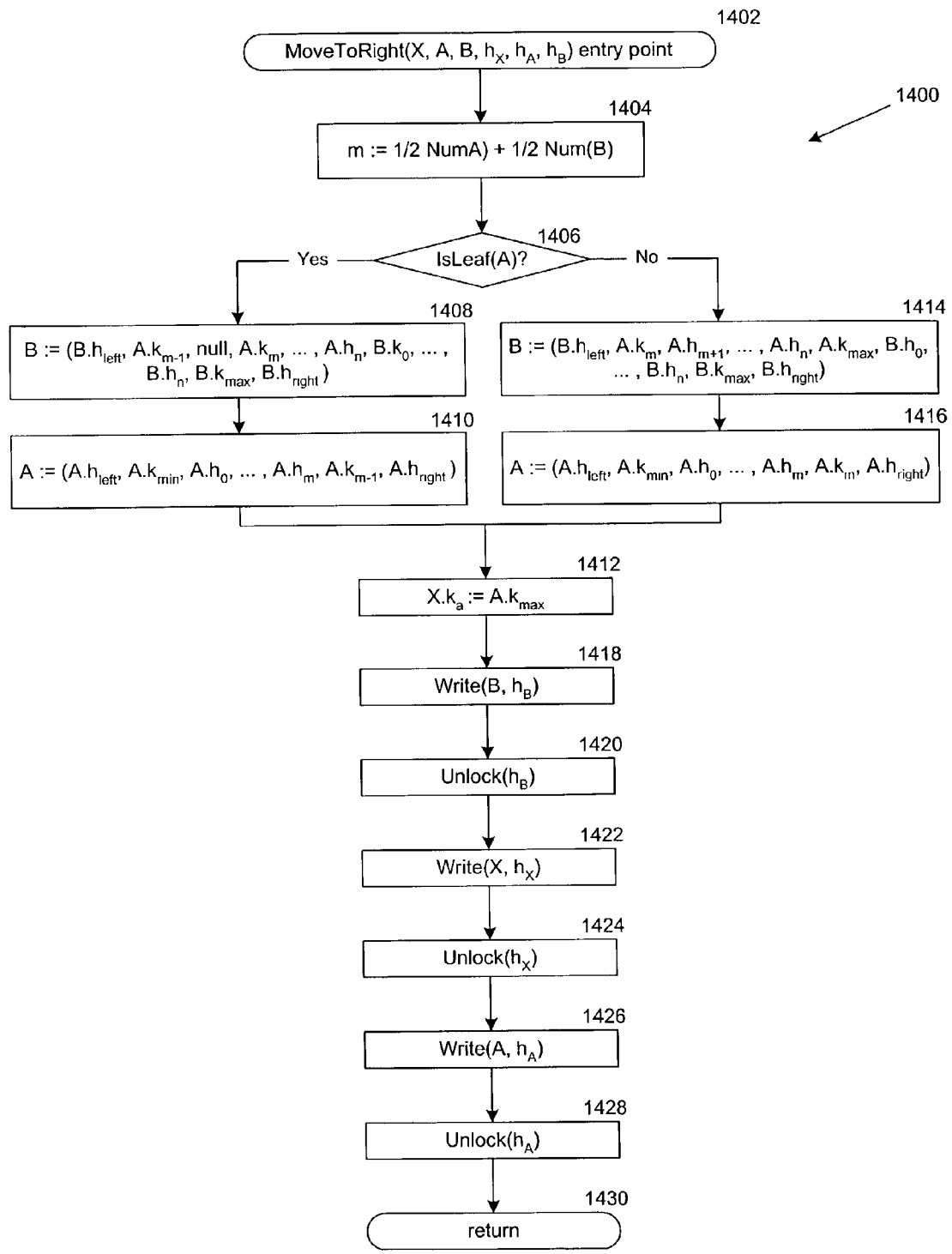
FIG. 14 is a flowchart of a procedure MoveToRight that moves parts of a node to its right sibling.

FIG. 14 is a flowchart of a procedure entitled MoveToRight which takes index nodes X, A, B and index node handles $h_X$, $h_A$, $h_B$. Steps 1402 through 1406 are directly analogous to steps 1302 through 1306 discussed above, except in 1404 the variable n is defined as ½Num(A)+½Num(B) instead of as ½Num(B)−½Num(A). The remaining steps of procedure 1400 are similar to the corresponding steps of procedure 1300 discussed above but are modified in order to accomplish the move the right function. These differences will be apparent to one of ordinary skill in the art and will not be described here.

G. Conclusion

As mentioned above, while exemplary embodiments of the present invention have been described in connection with various computing devices and network architectures, the underlying concepts may be applied to any computing device or system in which it is desirable to traverse and/or perform other functions in connection with a B-Link or other data structure. Thus, the procedures and systems described above may be applied to a variety of applications and devices. While exemplary data structures, programming languages, names and examples are chosen herein as representative of various choices, these are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the debugging interface aspects of the present invention, e.g., through the use of a data processing API or the like, are preferably implemented in a high level procedural or object-oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as a gate array, a programmable logic device (PLD), a client computer, or the like. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the presently preferred embodiments, it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

We claim:

1. An information management system, comprising:
   a computer;
   a database operatively connected to said computer, wherein said database comprises a B-Tree data structure comprising a plurality of nodes associated with disk blocks and handles stored in said nodes, wherein at least one left-link handle, $h_{left}$, stored in each node points to a left sibling of that node; and
   a mechanism for performing a lookup operation with respect to a key, k, wherein, in traversing the B-Tree at a given node, said lookup operation refers to said left-link handle, $h_{left}$, of that node to access a left sibling of the node if the key k is less than or equal to a value $K_{min}$ stored in the node.

2. An information management system as recited in claim 1, further comprising a mechanism for performing an insert operation.

3. An information management system as recited in claim 2, wherein the insert operation detects if the key range of an index node, A, does not include the key k that the operation is trying to locate, and wherein said operation follows a handle $A.h_{left}$ to the left sibling when $k \leq A.k_{min}$.

4. An information management system as recited in claim 1, further comprising a mechanism for performing a delete operation.

5. An information management system as recited in claim 4, wherein the delete operation detects if the key range of an index node, A, does not include the key k that the operation is trying to locate, and wherein said operation follows a handle $A.h_{left}$ to the left sibling when $k \leq A.k_{min}$.

6. An information management system as recited in claim 1, further comprising mechanisms for performing insert and delete operations, wherein said lookup, insert and delete operations detect if the key range of an index node, A, does not include the key k that the operation is trying to locate, and wherein said operations follow a handle $A.h_{left}$ to the left sibling when $k \leq A.k_{min}$.

7. An information management system as recited in claim 1, wherein the B-Tree data structure comprises at least one index node having the following structure:

$<h_{left}, k_{min}, h_0, k_0, h_1, k_1, \ldots, h_{n-1}, k_{n-1}, h_n, k_{max}, h_{right}>$ wherein $h_{left}$ is a handle of a left sibling and the remaining data elements ($k_{min}, h_0, k_0, h_1, k_1, \ldots, h_{n-1}, k_{n-1}, h_n, k_{max}, h_{right}$) are handles and keys according to a B-Link Tree data structure.

8. A computer-implemented method, comprising maintaining a data structure comprising a plurality of nodes and handles stored in said nodes, wherein at least one left-link handle, $h_{left}$, stored in each node points to a left sibling of that node; wherein the method further comprises performing a lookup operation with respect to a key, k, wherein the lookup operation involves traversing the data structure and, at a given node, referring to said left-link handle, $h_{left}$, of that node to access a left sibling of the node if the key k is less than or equal to a value $k_{min}$ stored in the node.

9. A method as recited in claim 8, further comprising performing an insert operation.

10. A method as recited in claim 9, wherein the insert operation detects if the key range of an index node, A, does not include the key k that the operation is trying to locate, and wherein said operation follows a handle $A.h_{left}$ to the left sibling when $k \leq A.k_{min}$.

11. A method as recited in claim 8, further comprising a mechanism for performing a delete operation.

12. A method as recited in claim 11, wherein the delete operation detects if the key range of an index node, A, does not include the key k that the operation is trying to locate, and wherein said operation follows a handle $A.h_{left}$ to the left sibling when $k \leq A.k_{min}$.

13. A method as recited in claim 12, further comprising performing insert and delete operations, wherein said lookup, insert and delete operations detect if the key range of an index node, A, does not include the key k that the operation is trying to locate, and wherein said operations follow a handle $A.h_{left}$ to the left sibling when $k \leq A.k_{min}$.

14. A method as recited in claim 8, wherein the data structure comprises at least one index node having the following structure:

$$<h_{left}, k_{min}, h_0, k_0, h_1, k_1, \ldots, h_{n-1}, k_{n-1} h_n, h_n, k_{max}, h_{right}>$$

wherein $h_{left}$ is a handle of a left sibling and the remaining data elements ($k_{min}, h_0, k_0, h_1, k_1, \ldots, h_{n-1}, k_{n-1}, k_{max}, h_{right}$) are handles and keys according to a B-Link Tree data structure.

* * * * *

UNITED STATES PATENT AND TRADEMARK OFFICE
CERTIFICATE OF CORRECTION

PATENT NO. : 7,007,027 B2
APPLICATION NO. : 10/308293
DATED : February 28, 2006
INVENTOR(S) : Najork et al.

It is certified that error appears in the above-identified patent and that said Letters Patent is hereby corrected as shown below:

On the title page, in item (56), under "Other Publications", in column 1, line 2, delete "Joural" and insert -- Journal --, therefor.

On the title page, in item (56), under "Other Publications", in column 1, line 6, delete "N.Y.," before "pp.".

On the title page, in item (56), under "Other Publications", in column 2, line 19, delete "AN" and insert -- An --, therefor.

On page 2, in item (56), under "Other Publications", in column 1, line 26, delete "B-Tress" and insert -- B-Trees --, therefor.

On page 2, in item (56), under "Other Publications", in column 2, line 21, delete "Conference,," and insert -- Conference, --, therefor.

On page 3, in item (56), under "Other Publications", in column 2, line 14, delete "B-Tree" and insert -- B-tree --, therefor.

In column 2, line 41, delete "not-include" and insert -- not include --, therefor.

In column 5, line 8, delete "the-scope" and insert -- the scope --, therefor.

In column 8, line 31, delete "<kid>." and insert -- <k,d>. --, therefor.

In column 8, line 40, delete "A.k.$_{max}$" and insert -- A.k$_{max}$ --, therefor.

In column 9, line 67, after "(because k≤A.k$_{min}$)" insert -- , --.

In column 11, line 15, delete "6," and insert -- I6, --, therefor.

In column 12, line 4, delete "h := A.k$_{left}$" and insert -- h := A.h$_{left}$ --, therefor.

Signed and Sealed this

Fifth Day of October, 2010

David J. Kappos
*Director of the United States Patent and Trademark Office*

CERTIFICATE OF CORRECTION (continued)
U.S. Pat. No. 7,007,027 B2

In column 12, line 30, after "the" delete "10".

In column 15, line 63, delete "h," and insert -- $h_x$ --, therefor.

In column 17, line 53, delete "steps-856" and insert -- steps 856 --, therefor.

In column 21, line 12, delete "1 105" and insert -- 1105 --, therefor.

In column 24, line 26, in Claim 1, delete "K$_{min}$" and insert -- k$_{min}$ --, therefor.

In column 26, line 1, in Claim 13, delete "claim 12," and insert -- claim 8, --, therefor.

In column 26, line 10, in Claim 14, delete "$k_{n-1}h_n$," and insert -- $k_{n-1}$, $h_n$, --, therefor.

In column 26, line 13, in Claim 14, delete "$h_l$," and insert -- $h_1$, --, therefor.